US012777536B2

(12) United States Patent
Kutz et al.

(10) Patent No.: US 12,777,536 B2
(45) Date of Patent: Oct. 27, 2026

(54) RANK AUGMENTATION USING SIDELINK AND COMPANION DEVICES

(71) Applicant: QUALCOMM Incorporated, San Diego, CA (US)

(72) Inventors: Gideon Shlomo Kutz, Ramat Hasharon (IL); Eliyahu Arbiv, Nir Galim (IL); Assaf Touboul, Netanya (IL); Michael Levitsky, Rehovot (IL); Guy Wolf, Rosh Haayin (IL); Amit Bar-Or Tillinger, Tel-Aviv (IL); Oren Matsrafi, Yad Modechai (IL); Shaul Shamay, Rishon le Zion (IL)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/537,316

(22) Filed: Dec. 12, 2023

(65) Prior Publication Data

US 2025/0193947 A1 Jun. 12, 2025

(51) Int. Cl.
*H04W 76/14* (2018.01)
*H04B 7/0413* (2017.01)

(52) U.S. Cl.
CPC .......... *H04W 76/14* (2018.02); *H04B 7/0413* (2013.01)

(58) Field of Classification Search
CPC ..... H04W 76/10; H04W 76/14; H04W 76/15; H04W 40/30; H04W 40/40; H04W 40/46; H04W 72/40; H04W 4/40; H04W 4/46; H04B 7/06; H04B 7/0613; H04B 7/0615; H04B 7/0619; H04B 7/0621; H04B 7/063;

(Continued)

(56) References Cited

U.S. PATENT DOCUMENTS

2021/0037601 A1* 2/2021 Xu .................... H04W 88/04
2022/0248480 A1 8/2022 Elshafie et al.

(Continued)

FOREIGN PATENT DOCUMENTS

WO WO-2021025966 A1 2/2021

OTHER PUBLICATIONS

Tsai et al., "MIMO Evolution Toward 6G: End-User-Centric Collaborative MIMO", Nov. 13, 2023, IEEE Communications Magazine, vol. 62, Issue: 7, pp. 104-110, DOI: 10.1109/MCOM.022.2300282 (Year: 2023).*

*Primary Examiner* — Paul H. Masur
(74) *Attorney, Agent, or Firm* — Holland & Hart LLP/QUALCOMM Incorporated

(57) ABSTRACT

Methods, systems, and devices for wireless communications are described. The described techniques provide for a user equipment (UE) to establish, with a wireless device (e.g., a companion device), a sidelink that is configured to enable a second channel rank for communications between the UE and a network entity. In some cases, the UE may support a first channel rank for communications between the UE and the network entity, and the second channel rank may be greater than the first channel rank. The UE may communicate, via an access link with the network entity, one or more multiple-input multiple-output (MIMO) signals intended for communications between the UE and the network entity utilizing the second channel rank. In some examples, the UE may communicate, via the sidelink with the wireless device, one or more second signals based on the one or more first MIMO signals.

30 Claims, 17 Drawing Sheets

(58) Field of Classification Search
CPC ...... H04B 7/0486; H04B 7/0487; H04B 7/04; H04B 7/0404; H04B 7/0413
See application file for complete search history.

(56) References Cited

U.S. PATENT DOCUMENTS

| | | | | |
|---|---|---|---|---|
| 2024/0056131 | A1* | 2/2024 | Matsumura | H04W 4/70 |
| 2024/0292433 | A1* | 8/2024 | Elshafie | H04W 72/51 |
| 2025/0125838 | A1* | 4/2025 | Xu | H04L 1/1864 |

* cited by examiner

RANK AUGMENTATION USING SIDELINK AND COMPANION DEVICES

FIELD OF TECHNOLOGY

The following relates to wireless communications, including rank augmentation using sidelink and companion devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication devices in a wireless communications system may have highly correlated antennas based on their form factor. In some cases, the high correlation of the antennas may potentially limit a throughput of wireless communications with other wireless communication devices. Additionally, some wireless devices may communicate with companion devices via sidelink communication links, and the companion devices may support communications with the network.

SUMMARY

The described techniques relate to improved methods, systems, devices, and apparatuses that support rank augmentation using sidelink and companion devices. For example, the described techniques provide for a user equipment (UE) to establish, with a wireless device (e.g., a companion device), a sidelink that is configured to enable a second channel rank for communications between the UE and a network entity. In some cases, the UE may support a first channel rank for communications between the UE and the network entity, and the second channel rank may be greater than the first channel rank. The UE may communicate, via an access link with the network entity, one or more multiple-input multiple-output (MIMO) signals intended for communications between the UE and the network entity utilizing the second channel rank. In some examples, the UE may communicate, via the sidelink with the wireless device, one or more second signals based on the one or more first MIMO signals. In some cases, the UE communicates the one or more second signals based on a transfer of samples of the one or more first MIMO signals. In other cases, the UE communicates the one or more second signals based on radio frequency (RF) adjustments to the one or more first MIMO signals.

A method for wireless communications by a wireless device is described. The method may include establishing, with a UE that supports a first channel rank for communications between the UE and a network entity, a sidelink that is configured to enable a second channel rank for the communications between the UE and the network entity, where the second channel rank is greater than the first channel rank, communicating, via an access link with the network entity and based on establishing the sidelink, one or more first MIMO signals intended for communications between the UE and the network entity utilizing the second channel rank, and communicating, via the sidelink with the UE, one or more second signals that are based on the one or more first MIMO signals intended for communications between the UE and the network entity utilizing the second channel rank.

A wireless device for wireless communications is described. The wireless device may include one or more memories storing processor executable code, a transceiver, and one or more processors of a companion device coupled with the one or more memories. The one or more processors may individually or collectively be operable to execute the code to cause the wireless device to establish, with a UE that supports a first channel rank for communications between the UE and a network entity, a sidelink that is configured to enable a second channel rank for the communications between the UE and the network entity, where the second channel rank is greater than the first channel rank, communicate, via the transceiver and an access link with the network entity and based on establishing the sidelink, one or more first MIMO signals intended for communications between the UE and the network entity utilizing the second channel rank, and communicate, via the transceiver and the sidelink with the UE, one or more second signals that are based on the one or more first MIMO signals intended for communications between the UE and the network entity utilizing the second channel rank.

Another wireless device for wireless communications is described. The wireless device may include means for establishing, with a UE that supports a first channel rank for communications between the UE and a network entity, a sidelink that is configured to enable a second channel rank for the communications between the UE and the network entity, where the second channel rank is greater than the first channel rank, means for communicating, via an access link with the network entity and based on establishing the sidelink, one or more first MIMO signals intended for communications between the UE and the network entity utilizing the second channel rank, and means for communicating, via the sidelink with the UE, one or more second signals that are based on the one or more first MIMO signals intended for communications between the UE and the network entity utilizing the second channel rank.

A non-transitory computer-readable medium storing code for wireless communications is described. The code may include instructions executable by one or more processors to establish, with a UE that supports a first channel rank for communications between the UE and a network entity, a sidelink that is configured to enable a second channel rank for the communications between the UE and the network entity, where the second channel rank is greater than the first channel rank, communicate, via an access link with the network entity and based on establishing the sidelink, one or more first MIMO signals intended for communications between the UE and the network entity utilizing the second channel rank, and communicate, via the sidelink with the UE, one or more second signals that are based on the one or more more first MIMO signals intended for communications between the UE and the network entity utilizing the second channel rank.

In some examples of the method, wireless devices, and non-transitory computer-readable medium described herein, the wireless device supports a third channel rank for the access link between the wireless device and the network entity and the second channel rank may be based on a combination of the first channel rank and the third channel rank. In some examples of the method, wireless devices, and non-transitory computer-readable medium described herein, the second channel rank may be based on a combined antenna count of a first set of antennas at the wireless device and second set of antennas at the UE.

Some examples of the method, wireless devices, and non-transitory computer-readable medium described herein may further include operations, features, means, or instructions for transmitting, to the UE, the network entity, or both, capability information associated with enabling the second channel rank by the wireless device and the UE.

In some examples of the method, wireless devices, and non-transitory computer-readable medium described herein, communicating the one or more first MIMO signals and the one or more second signals may include operations, features, means, or instructions for receiving, via the access link with the network entity, the one or more first MIMO signals, generating a set of samples of the one or more first MIMO signals, and transmitting, via the sidelink with the UE, the one or more second signals that include the set of samples of the one or more first MIMO signals.

Some examples of the method, wireless devices, and non-transitory computer-readable medium described herein may further include operations, features, means, or instructions for transmitting, via the sidelink with the UE, respective timestamps for each sample of the set of samples, where each respective timestamp supports synchronization of the one or more first MIMO signals between the wireless device and the UE.

Some examples of the method, wireless devices, and non-transitory computer-readable medium described herein may further include operations, features, means, or instructions for receiving, from the UE via the sidelink, control information including timing information for communicating the one or more first MIMO signals, one or more quantization parameters for quantizing samples of the one or more first MIMO signals, or both, where the one or more first MIMO signals, the one or more second signals, or both, may be communicated in accordance with the control information.

In some examples of the method, wireless devices, and non-transitory computer-readable medium described herein, communicating the one or more first MIMO signals and the one or more second signals may include operations, features, means, or instructions for receiving, via the sidelink with the UE, the one or more second signals that include a set of samples corresponding to the one or more first MIMO signals and transmitting, via the access link with the network entity, the one or more first MIMO signals based on the set of samples.

In some examples of the method, wireless devices, and non-transitory computer-readable medium described herein, the one or more second signals include timing information associated with transmitting the one or more first MIMO signals and the one or more first MIMO signals may be transmitted in accordance with the timing information.

In some examples of the method, wireless devices, and non-transitory computer-readable medium described herein, communicating the one or more first MIMO signals and the one or more second signals may include operations, features, means, or instructions for receiving, via the access link with the network entity, the one or more first MIMO signals, applying one or more RF adjustments to the one or more first MIMO signals, and transmitting, via the sidelink with the UE, the one or more second signals that may be based on the one or more RF adjustments.

In some examples of the method, wireless devices, and non-transitory computer-readable medium described herein, applying the one or more RF adjustments may include operations, features, means, or instructions for converting the one or more first MIMO signals from a first carrier frequency to a second carrier frequency, duplicating the one or more first MIMO signals over a set of multiple contiguous carrier frequencies, amplifying the one or more first MIMO signals, or any combination thereof.

In some examples of the method, wireless devices, and non-transitory computer-readable medium described herein, applying the one or more RF adjustments to the one or more first MIMO signals may include operations, features, means, or instructions for applying at least one respective frequency adjustment at each antenna in the wireless device.

In some examples of the method, wireless devices, and non-transitory computer-readable medium described herein, communicating the one or more first MIMO signals and the one or more second signals may include operations, features, means, or instructions for receiving, via the sidelink with the UE, the one or more second signals corresponding to the one or more first MIMO signals, applying one or more RF adjustments to the one or more second signals, and transmitting, via the access link with the network entity, the one or more first MIMO signals based on the one or more RF adjustments.

In some examples of the method, wireless devices, and non-transitory computer-readable medium described herein, the one or more first MIMO signals communicated between the wireless device and the network entity supplement one or more additional first MIMO signals communicated between the UE and the network entity. In some examples of the method, wireless devices, and non-transitory computer-readable medium described herein, the wireless device includes extended reality eyewear or a smartwatch. In some examples of the method, wireless devices, and non-transitory computer-readable medium described herein, the wireless device may be a second UE.

A method for wireless communications by a UE is described. The method may include establishing, with a wireless device, a sidelink that is configured to enable a second channel rank for communications between the UE and a network entity, where the UE supports a first channel rank for the communications between the UE and the network entity, and where the second channel rank is greater than the first channel rank, communicating, via an access link with the network entity and based on establishing the sidelink, one or more first MIMO signals intended for communications between the UE and the network entity utilizing the second channel rank, and communicating, via the sidelink with the wireless device, one or more second signals that are based on the one or more first MIMO signals intended for communications between the UE and the network entity utilizing the second channel rank.

A UE for wireless communications is described. The UE may include one or more memories storing processor executable code, a transceiver, and one or more processors of a UE coupled with the one or more memories. The one or more processors may individually or collectively be operable to execute the code to cause the UE to establish, with a wireless device, a sidelink that is configured to enable a second channel rank for communications between the UE and a network entity, where the UE supports a first channel rank for the communications between the UE and the network entity, and where the second channel rank is greater than the first channel rank, communicate, via the transceiver and an access link with the network entity and based on establishing the sidelink, one or more first MIMO signals intended for communications between the UE and the network entity utilizing the second channel rank, and communicate, via the transceiver and the sidelink with the wireless device, one or more second signals that are based on the one or more first MIMO signals intended for communications between the UE and the network entity utilizing the second channel rank.

Another UE for wireless communications is described. The UE may include means for establishing, with a wireless device, a sidelink that is configured to enable a second channel rank for communications between the UE and a network entity, where the UE supports a first channel rank for the communications between the UE and the network entity, and where the second channel rank is greater than the first channel rank, means for communicating, via an access link with the network entity and based on establishing the sidelink, one or more first MIMO signals intended for communications between the UE and the network entity utilizing the second channel rank, and means for communicating, via the sidelink with the wireless device, one or more second signals that are based on the one or more first MIMO signals intended for communications between the UE and the network entity utilizing the second channel rank.

A non-transitory computer-readable medium storing code for wireless communications is described. The code may include instructions executable by one or more processors to establish, with a wireless device, a sidelink that is configured to enable a second channel rank for communications between the UE and a network entity, where the UE supports a first channel rank for the communications between the UE and the network entity, and where the second channel rank is greater than the first channel rank, communicate, via an access link with the network entity and based on establishing the sidelink, one or more first MIMO signals intended for communications between the UE and the network entity utilizing the second channel rank, and communicate, via the sidelink with the wireless device, one or more second signals that are based on the one or more first MIMO signals intended for communications between the UE and the network entity utilizing the second channel rank.

In some examples of the method, UEs, and non-transitory computer-readable medium described herein, the wireless device supports a third channel rank for communications between the wireless device and the network entity and the second channel rank may be based on a combination of the first channel rank and the third channel rank. In some examples of the method, UEs, and non-transitory computer-readable medium described herein, the second channel rank may be based on a combined antenna count of a first set of antennas at the wireless device and second set of antennas at the UE.

Some examples of the method, UEs, and non-transitory computer-readable medium described herein may further include operations, features, means, or instructions for transmitting, to the wireless device, the network entity, or both, capability information associated with enabling the second channel rank by the wireless device and the UE.

In some examples of the method, UEs, and non-transitory computer-readable medium described herein, the capability information includes an indication of a duration associated with communicating via the access link with the network entity, a feedback response duration, a quantity of antennas associated with the wireless device and the UE, or any combination thereof.

Some examples of the method, UEs, and non-transitory computer-readable medium described herein may further include operations, features, means, or instructions for transmitting, to the network entity, channel state information associated with utilizing the second channel rank for communications between the UE and the network entity.

In some examples of the method, UEs, and non-transitory computer-readable medium described herein, communicating the one or more first MIMO signals and the one or more second signals may include operations, features, means, or instructions for receiving, via the sidelink with the wireless device, the one or more second signals including a set of samples associated with the one or more first MIMO signals, receiving, via the access link with the network entity, the one or more first MIMO signals, and processing the one or more first MIMO signals in combination with the one or more second signals.

Some examples of the method, UEs, and non-transitory computer-readable medium described herein may further include operations, features, means, or instructions for receiving, via the sidelink with the wireless device, respective timestamps for each sample of the set of samples, where the one or more first MIMO signals may be processed in combination with the one or more second signals based on the respective timestamps.

Some examples of the method, UEs, and non-transitory computer-readable medium described herein may further include operations, features, means, or instructions for transmitting, to the wireless device via the sidelink, control information including timing information for communicating the one or more first MIMO signals, one or more quantization parameters for quantizing samples of the one or more first MIMO signals, or both, where the one or more second signals may be received based on the control information.

In some examples of the method, UEs, and non-transitory computer-readable medium described herein, communicating the one or more first MIMO signals and the one or more second signals may include operations, features, means, or instructions for transmitting, via the sidelink with the wireless device, the one or more second signals that include a set of samples corresponding to the one or more first MIMO signals and transmitting, via the access link with the network entity, the one or more first MIMO signals.

In some examples of the method, UEs, and non-transitory computer-readable medium described herein, the one or more second signals include timing information associated with transmitting the one or more first MIMO signals and the one or more first MIMO signals may be transmitted in accordance with the timing information.

In some examples of the method, UEs, and non-transitory computer-readable medium described herein, communicating the one or more first MIMO signals and the one or more second signals may include operations, features, means, or instructions for receiving, via the sidelink with the wireless device, the one or more second signals that may be based on the one or more first MIMO signals received by the wireless device and combining a set of multiple carrier frequencies associated with the one or more second signals and the one or more first MIMO signals received at the UE.

In some examples of the method, UEs, and non-transitory computer-readable medium described herein, communicating the one or more first MIMO signals and the one or more second signals may include operations, features, means, or instructions for transmitting, via the sidelink with the wireless device, the one or more second signals that may be based on the one or more first MIMO signals to be transmitted by the UE and transmitting, via the access link with the network entity, the one or more first MIMO signals.

In some examples of the method, UEs, and non-transitory computer-readable medium described herein, the one or more first MIMO signals communicated between the UE and the network entity supplement one or more additional first MIMO signals communicated between the wireless device and the network entity.

In some examples of the method, UEs, and non-transitory computer-readable medium described herein, the wireless device includes extended reality eyewear or a smartwatch. In some examples of the method, UEs, and non-transitory computer-readable medium described herein, the wireless device may be a second UE.

DETAILED DESCRIPTION

Some wireless communications systems (e.g., systems that support ultrawide bandwidth (UWB) compliant sidelink) may enable communication between user equipment (UEs) and companion devices (e.g., extended reality (XR) goggles or smartwatches). In some examples, the companion device may offload computational tasks and air interface (e.g., Uu) communications with a network entity to a nearby UE. In such examples, the companion device may experience lower power consumption based on offloading the tasks and communications. However, in some wireless communications systems, a form factor of the UE may limit a throughput of communications (e.g., a limited channel rank) between the UE and the network entity. For example, a set of antennas of the UE may be highly correlated based on the form factor of the UE. To increase the throughput of communications between a UE and a network entity, a wireless communications system may support rank augmentation using companion devices.

The wireless communications system may support rank augmentation using a sidelink connection between a UE and the companion devices. For example, the companion devices may behave like remote antennas for the UE in an uplink direction and a downlink direction (e.g., via an access link, such as a Uu interface). A channel rank based on the companion devices and the UE may be larger than a channel rank based on the UE without the companion devices. In some examples, the companion devices communicate received signaling from the network entity or the UE via a transfer of samples of the signal. In other examples, the companion devices communicate the received signaling by performing radio-frequency (RF) adjustments (e.g., such that the RF adjusted signals are UWB sidelink compliant). Additionally, other UEs may act as each other's augmented antennas. The wireless communications system may implement control signaling to support these techniques. For example, the UE and the companion devices may signal a capability to augment the channel rank to the network entity. The network entity and the UE may also compensate for timing limitations due to the rank augmentation.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to rank augmentation using sidelink and companion devices.

Figure 1:
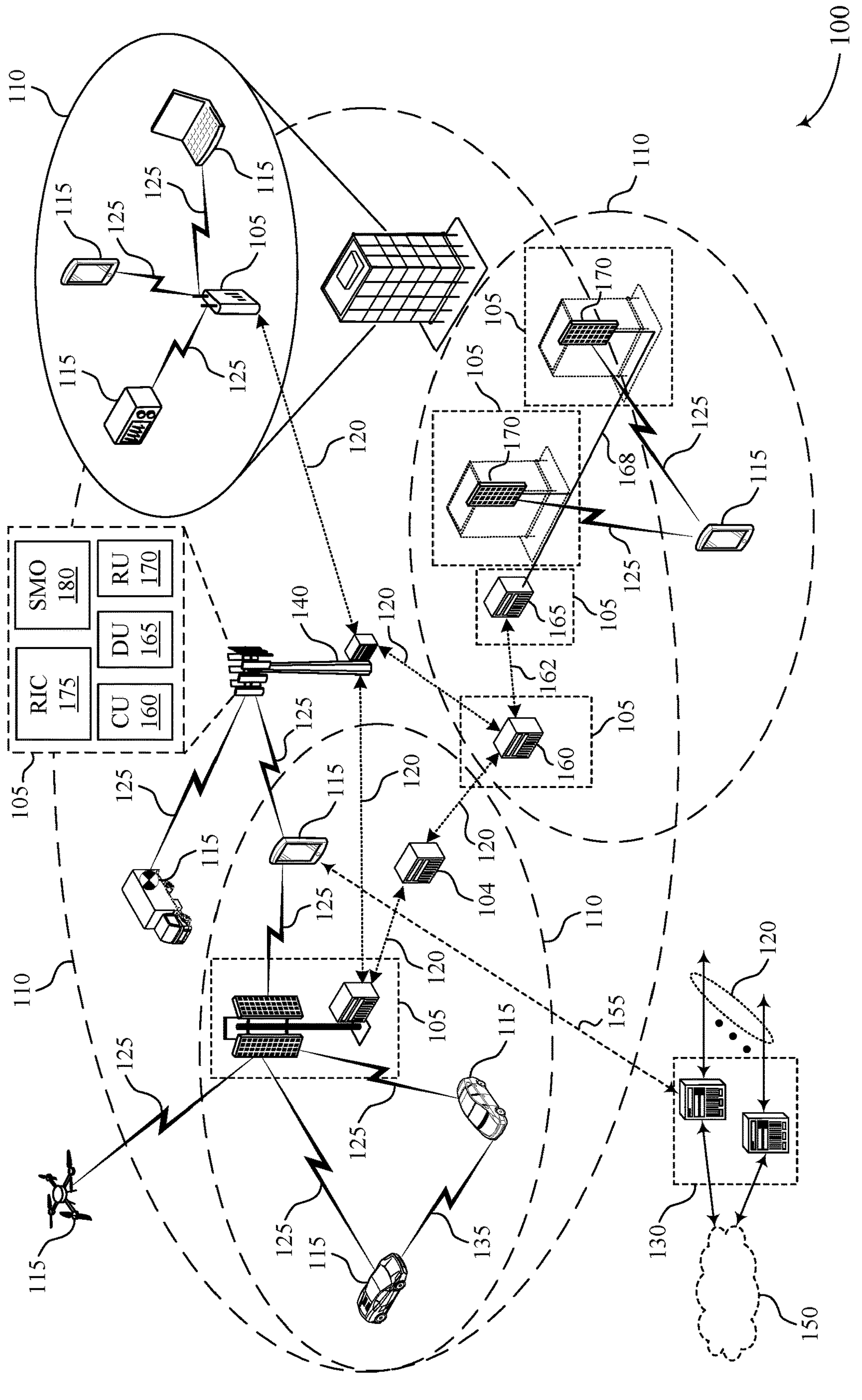
FIGS. 1 through 4 show examples of wireless communications systems that supports rank augmentation using sidelink and companion devices in accordance with one or more aspects of the present disclosure.

FIG. 1 shows an example of a wireless communications system 100 that supports rank augmentation using sidelink and companion devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support rank augmentation using sidelink and companion devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a sidelink between the UE 115 and a companion device (e.g., a wireless device) may support UWB capabilities. In some cases, the wireless device may offload tasks (e.g., computational tasks for an XR application), communications (e.g., via air interface) with a network entity 105, or both, to the UE 115. For example, the wireless device may offload tasks or communications based on a distance of the wireless device from the UE 115 satisfying a distance threshold. In such cases, the offloading of tasks, communications, or both, to the UE 115 may enable lower power consumption at the companion device compared to other wireless communications systems that may not support the offloading of tasks or communications.

In some other wireless communications systems, a form factor of the UE may limit a throughput of communications (e.g., a limited channel rank) between the UE and the network entity. For example, a set of antennas of the UE may be highly correlated based on the form factor of the UE. To increase the throughput of communications between a UE 115 and a network entity 105, the wireless communications system 100 may support rank augmentation using companion devices.

The wireless communications system 100 may support rank augmentation using sidelink and the companion devices. For example, the companion devices may behave like remote antennas for the UE 115 in an uplink direction and a downlink direction. A channel rank based on the companion devices and the UE 115 may be larger than a channel rank based on the UE 115 without the companion devices. In some examples, the companion devices communicate received signaling from the network entity 105 or the UE 115 via a transfer of samples of the signal. In other examples, the companion devices communicate the received signaling by performing RF adjustments (e.g., such that the RF adjusted signals are UWB sidelink compliant). Additionally, other UEs 115 may act as each other's augmented antennas. The wireless communications system may implement control signaling to support these techniques. For example, the UE 115 and the companion devices may signal a capability to augment the channel rank to the network entity. The network entity 105 may also compensate for timing limitations due to the rank augmentation. Accordingly, the techniques described herein may support an improved channel rank for communications between the UE 115 and the network entity 105, and as a result, improved throughput.

Figure 2:
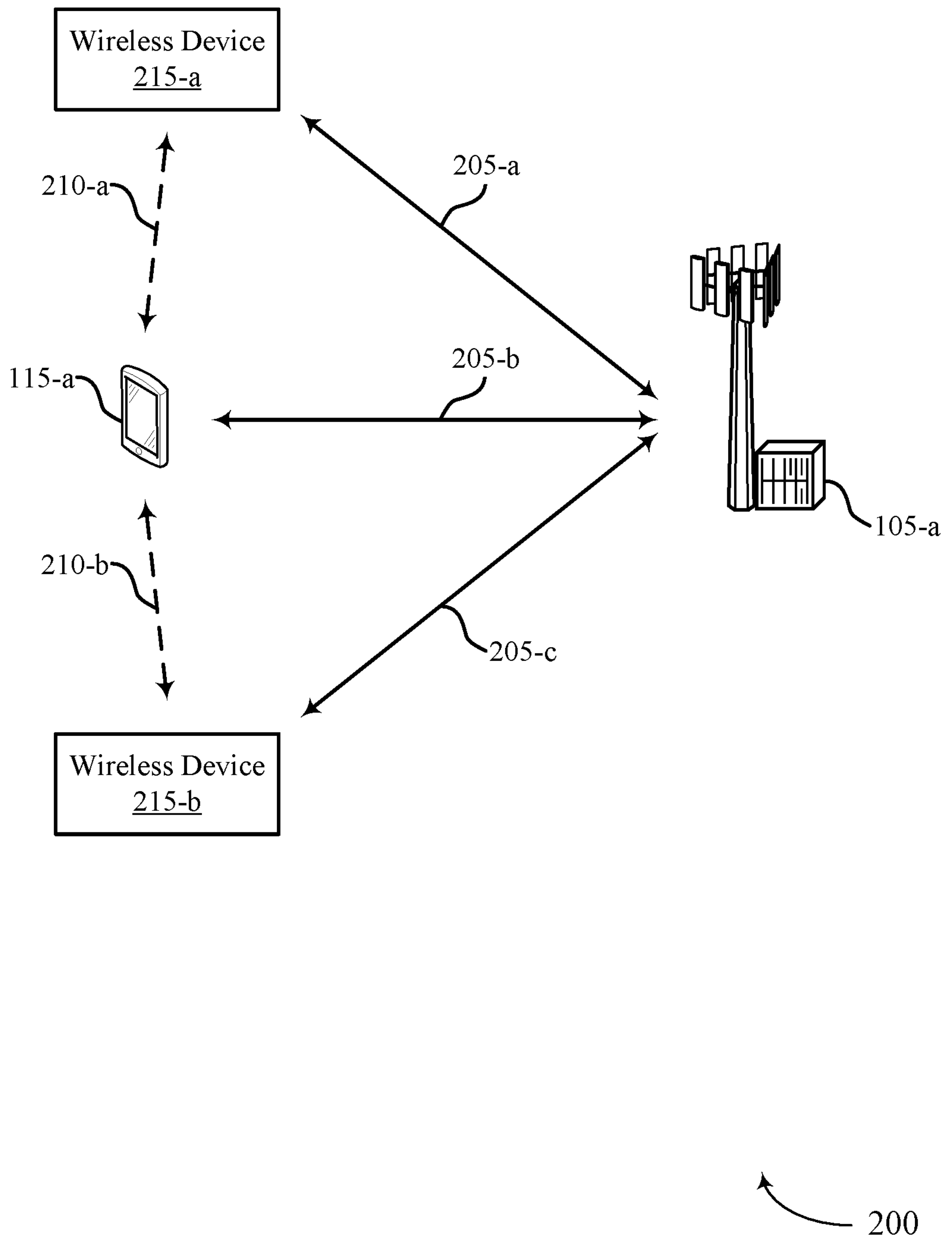

FIG. 2 shows an example of a wireless communications system 200 that supports rank augmentation using sidelink and companion devices in accordance with one or more aspects of the present disclosure. In some examples, the wireless communications system 200 may implement or be implemented by aspects of the wireless communications system 100. For example, the wireless communications system 200 may include one or more network entities 105 (e.g., network entity 105-*a*) and one or more UEs 115 (e.g., UE 115-*a*), which may be examples of the corresponding devices as described with reference to FIG. 1. In some examples, the UE 115-*a* may support rank augmentation using one or more sidelinks 210 and one or more wireless devices 215 (e.g., a wireless device 215-*a* or a wireless device 215-*b*). In some examples, the one or more wireless devices 215 may include a companion device to the UE 115-*a* (e.g., a smartwatch, XR eyewear, earphones, artificial intelligence (AI) companion device, an automobile infotainment or navigation system, gaming device, or other wireless device) or a second UE 115. In some cases, to support rank augmentation, the one or more wireless devices 215 may contribute a set of antennas to the UE 115-*a*, and the UE 115-*a* may contribute a set of antennas to the one or more wireless devices 215 (e.g., when the one or more wireless devices include the second UE 115).

In some other systems, UE antennas may be highly correlated (e.g., due to a small form factor of the UE). In these other systems, the highly correlated UE antennas may limit a communication channel rank between the UE and a network entity. The wireless communications system 200 may support rank augmentation, such that the UE 115-*a* may communicate with the network entity 105-*a* via one or more access links 205 with an increased channel rank by leveraging antennas of one or more of the wireless devices 215 for communications with the network entity 105-*a*. One example of an access link 205 is a Uu interface. The increased channel rank may be larger than a first channel rank for communications between the one or more wireless devices 215 and the network entity 105-*a* and a second channel rank for communications between the UE 115-*a* and the network entity 105-*a*. In some examples, the increased channel rank may enable enhanced throughput for communication via the one or more access links 205. In some cases, the increased channel rank may be a combination of the first channel rank and the second channel rank.

In some examples, the one or more wireless devices 215, the UE 115-*a*, or any combination thereof, may signal a capability via the one or more access links 205. In some cases, the UE 115-*a* may signal the capability based on communications with the wireless device 215-*a*, the wireless device 215-*b*, or both via the sidelink 210-*a* or the sidelink 210-*b*, respectively. In some cases, the UE 115-*a* may signal the capability dynamically based on the wireless device 215-*a* or the wireless device 215-*b*, or both, moving in or out of a coverage of the UE 115-*a* (e.g., a user may remove their watch or XR eyewear).

The capability signaling may indicate a capability for augmenting the channel rank in an uplink direction, downlink direction, or both. In some cases, the capability signaling may include a first duration based on a duration from an allocation grant message (e.g., physical downlink control channel (PDCCH)) to a corresponding data message. In some cases, the capability signaling may include a second duration based on a duration to transmit a feedback response (e.g., ACK/NACK). In some examples, the first duration and the second duration may be based on a quantity of the one or more wireless devices 215, a quantity of augmented antennas enabled in each of the one or more wireless devices 215 (e.g., wireless device 215-*a* and wireless device 215-*b*), or any combination thereof. As described in further detail herein, the durations may be different from (e.g., increased relative to) durations for communications between the UE 115-*a* and the network entity 105-*a* using the access link 205-*b* due to additional coordination and signaling between the UE 115-*a* and the one or more wireless devices 215. Additionally, or alternatively, the UE 115-*a* may request the increased channel rank via a channel state indicator (CSI) message based on the capability of the one or more wireless devices 215 to support antenna augmentation. That is, a CSI report transmitted from the UE 115-*a* to the network entity 105-*a* may indicate the increased channel rank.

In some examples, the one or more wireless devices 215 may include RF chains (e.g., the RF chains may support Uu frequencies). In such examples, the RF chains may enable the one or more wireless devices 215 to communicate with the network entity 105-*a* via the one or more access links 205. In some cases, antennas in the one or more wireless devices 215 may be relatively distant from the UE 115-*a* by many wavelengths (e.g., wavelengths of Uu frequencies). For example, a set of antennas in the one or more wireless devices 215 may be relatively distant from a set of antennas in the UE 115-*a*. In some examples, the set of relatively distant antennas in the one or more wireless devices 215 from the UE 115-*a* may reduce a correlation between the set of antennas in the UE 115-*a* and the set of antennas in the one or more wireless devices 215. In some cases, the antennas of the wireless devices 215 and the UE 115-*a* may be uncorrelated. Accordingly, the UE 115-*a* may support a higher effective channel rank with the network entity 105-*a* (e.g., the distant antennas of the one or more wireless devices 215 may enable throughput enhancement for communication between the network entity 105-*a* and the UE 115-*a*).

The network entity 105-*a* may communicate with the UE 115-*a* via an access link 205-*b*. In some examples, such as downlink communication scenarios, the wireless device 215-*a* and the wireless device 215-*b* may receive the communications via the access link 205-*a* and the access link 205-*c*, respectively. In some examples, the network entity 105-*a* may intend the communications for the UE 115-*a*. In some cases, the wireless device 215-*a* or the wireless device 215-*b* may transmit samples of the received signaling to the UE 115-*a* via the sidelink 210-*a* or the sidelink 210-*b*, respectively. In such cases, the UE 115-*a* may process the samples as if the UE 115-*a* received the samples from an additional antenna. The UE 115-*a* may receive downlink communications from the network entity 105-*a*, while also receiving the corresponding sample from the one or more wireless devices 215 such that the samples and downlink signals may be combined. Additionally, or alternatively, such as in uplink communication scenarios, the UE 115-*a* may transmit samples to the wireless device 215-*a* or the wireless device 215-*b* via the sidelink 210-*a* or the sidelink 210-*b*, respectively. In some cases, the wireless devices 215 may communicate with the network entity 105-*a* via the access link 205-*a* or the access link 205-*c* based on the samples from the UE 115-*a*. In such cases, the UE 115-*a* may also transmit uplink communications to the network entity 105-*a* while the one or more wireless devices 215 are communicating corresponding uplink communications. In some examples, the effective channel rank of the UE 115-*a* may be based on the one or more wireless devices 215 receiving, or transmitting, samples and communicating with the network entity 105-*a* via the one or more access links 205. The transmission of samples of the received signaling via the one or more sidelinks 210 is discussed further with reference to FIG. 3.

Additionally, or alternatively, the wireless device 215-*a* or the wireless device 215-*b* may transmit RF-adjusted signals to the UE 115-*a* via the sidelink 210-*a* or a sidelink 210-*b*, respectively. For example, the wireless device 215-*a* or the wireless device 215-*b* may transmit the RF-adjusted signals based on the received communications from the network entity 105-*a* via the one or more access links 205. In some cases, the UE 115-*a* may process the RF-adjusted signals as if the UE 115-*a* received the RF-adjusted signals from an additional antenna. Additionally, or alternatively, the UE 115-*a* may transmit RF-adjusted signals to the wireless device 215-*a* or the wireless device 215-*b* via the sidelink 210-*a* or the sidelink 210-*b*, respectively. In some cases, the one or more wireless devices 215 may communicate with the network entity 105-*a* via the access link 205-*a* or the access link 205-*c* based on the RF-adjusted signals from the UE 115-*a*. In some examples, the effective channel rank of the UE 115-*a* may be based on the one or more wireless devices 215 receiving, or transmitting, RF-adjusted signals and communicating with the network entity 105-*a* via the one or more access links 205. The transmission of RF-adjusted signals of the received signaling is discussed further with reference to FIG. 4.

In some examples, the UE 115-*a* and the one or more wireless devices 215 may communicate a mix of samples and RF-adjusted signals. For example, the wireless device 215-*a* may transmit samples of the received signaling via the sidelink 210-*a* and the wireless device 215-*b* may transmit RF adjusted signals based on the received signaling via the sidelink 210-*b*. In some cases, the one or more wireless devices 215 may include a second UE 115.

Figure 3:
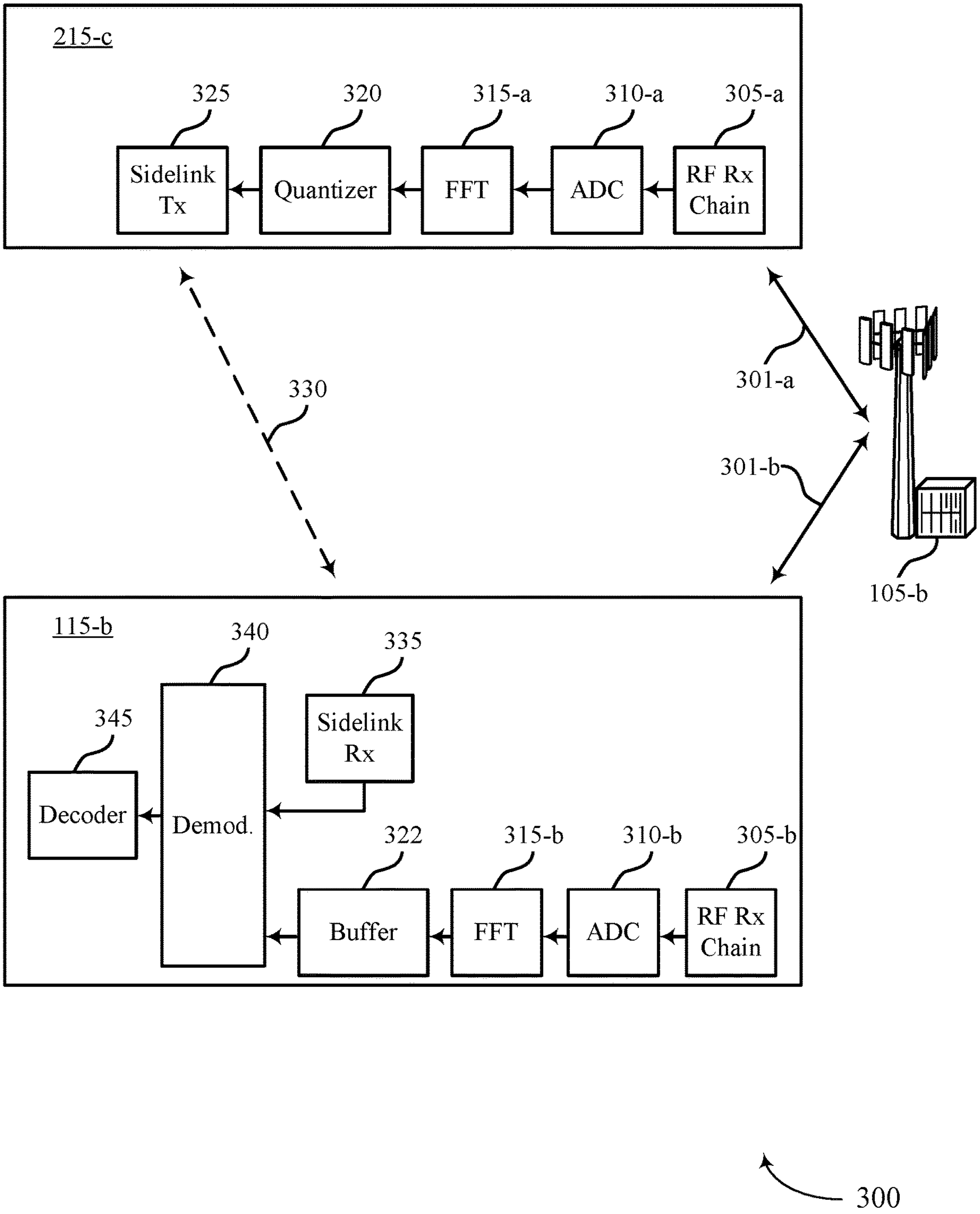

FIG. 3 shows an example of a wireless communications system 300 that supports rank augmentation using sidelink and companion devices in accordance with one or more aspects of the present disclosure. In some examples, the wireless communications system 300 may implement or be implemented by aspects of the wireless communications systems 100 and 200. For example, the wireless communications system 300 may include one or more network entities 105 (e.g., network entity 105-*b*) and one or more UEs 115 (e.g., UE 115-*b*), which may be examples of the corresponding devices as described with reference to FIGS. 1 and 2. In some examples, a wireless device 215-*c* may transmit samples to, or receive samples from, the UE 115-*b* via a sidelink 330 based on communications from the network entity 105-*b* via an access link 301-*a* or an access link 301-*b*. One example of an access link 301 is a Uu interface. FIG. 3 illustrates an example of rank augmentation using in-phase quadrature (I/Q) sampling at the wireless device 215-*c* to support channel rank augmentation for signals intend for communication between the UE 115-*b* and the network entity 105-*b*.

The wireless device 215-*c* may include an RF receiver chain 305-*a*, an analog-to-digital converter (ADC) 310-*a*, a fast Fourier transform module 315-*a*, and a quantizer 320. In a downlink scenario, the RF receiver chain 305-*a* may receive communications (e.g., MIMO signals) from the network entity 105-*b* via the access link 301-*a*. In some examples, the network entity 105-*b* may intend the communications for the UE 115-*b*. In some examples, the RF receiver chain 305-*a* may output the received communications to the ADC 310-*a*. The ADC 310-*a* may convert the received communications from an analog domain to a digital domain. In some cases, the FFT module 315-*a* may perform an FFT on the digital-domain received communications. In some cases, the quantizer 320 may quantize the output of the FFT module 315-*a*. In such cases, the quantizer 320 may generate samples (e.g., I/Q samples) of the received communications based on the output of the FFT.

The wireless device 215-*c* may code the generated samples. In some cases, the samples may include time-stamps (e.g., to enable synchronization between the samples of the wireless device 215-*c* and samples of the UE 115-*b*). In some examples, the wireless device 215-*c* may include the samples in a payload for the sidelink 330 (e.g., an UWB sidelink). In some examples, the sidelink transmission module 325 may transmit the generated samples to the UE 115-*b* via the sidelink 330. In some cases, the UE 115-*b* may transmit control signaling to the wireless device 215-*c* via the sidelink 330. For example, the control signaling may include timing parameters (e.g., when to open the RF receiver chain), quantization parameters (e.g., corresponding to signal-to-noise ratio (SNR) values), or any combination thereof. The quantization parameters may allow the quantizer 320 to quantize the output of the FFT module 315-*a* in a manner that allows the UE 115-*b* to decode or process the signals or samples received from the wireless device 215-*c*.

The UE 115-*b* may include an RF receiver chain 305-*b*, an ADC 310-*b*, an FFT module 315-*b*, a buffer 322, a sidelink receiver 335, a demodulator 340, and a decoder 345. In some cases, the RF receiver chain 305-*b* may receive communications (e.g., MIMO signals corresponding to the MIMO signals received at the wireless device 215-*c*) from the network entity 105-*b* via an access link 301-*b*. The RF receiver chain 305-*b* may output the received communications to the ADC 310-*b*. In some cases, the ADC 310-*b* may convert the received signaling from the analog domain to the digital domain. In some cases, the FFT module 315-*b* may perform an FFT on the digital-domain received communications.

The sidelink receiver 335 may receive the generated samples via the sidelink 330, and the demodulator 340 may demodulate the samples. The UE 115-*b* may process the samples similar to the communications received at the RF receiver chain 305-*b* (e.g., the UE 115-*b* may process the samples as if the samples were received from additional antennae of the UE 115-*b*). In some examples, the buffer 322 may enable support for latency in the sidelink 330. For example, the buffer 322 may enable the UE 115-*b* to process samples (e.g., in the demodulator 340) received at the RF receiver chain 305-*b* and the samples received at the sidelink receiver 335. That is, the buffer 322 may store the signals received from the receiver chain 305-*a* until the signals are ready for processing in conjunction with the signals received from the wireless device 215-*c* via the sidelink receiver 335 (e.g., to account for latency for communications via the sidelink 330). The UE 115-*b* may use the timestamps received from the wireless device 215-*c* to process the signals together.

In an uplink scenario, the UE 115-*b* may transmit samples to the wireless device 215-*c* via the sidelink 330 (e.g., samples based on signals generated at the UE 115-*a*). More particularly, the UE 115-*a* may generate signals for transmission to the network entity 105-*b* and the UE 115-*a* may sample (at least a portion of) the signals and transmit the samples to the wireless device 215-*c* for transmission to the network entity 105-*b*. In such examples, the wireless device 215-*c* may communicate with the network entity 105-*b* via the access link 301-*a* based on the samples. That is, the wireless device 215-*c* may transmit one or more MIMO signals that are based on the samples received from the UE 115-*b*. In some cases, the UE 115-*b* may transmit timing instructions with the samples. For example, the UE 115-*b* may transmit timing instructions such that the over-the-air signal timing difference between the UE 115-*b* and the wireless device 215-*c* satisfy a threshold duration (e.g., below a duration of a cyclic prefix (CP)). Thus, the UE 115-*b* may transmit MIMO signals to the network entity 105-*b* in conjunction with the wireless device 215-*b* transmitting corresponding MIMO signals to the network entity 105-*b*, such that the effective rank for communications between the UE 115-*b* and the network entity 105-*b* is increased.

Figure 4:
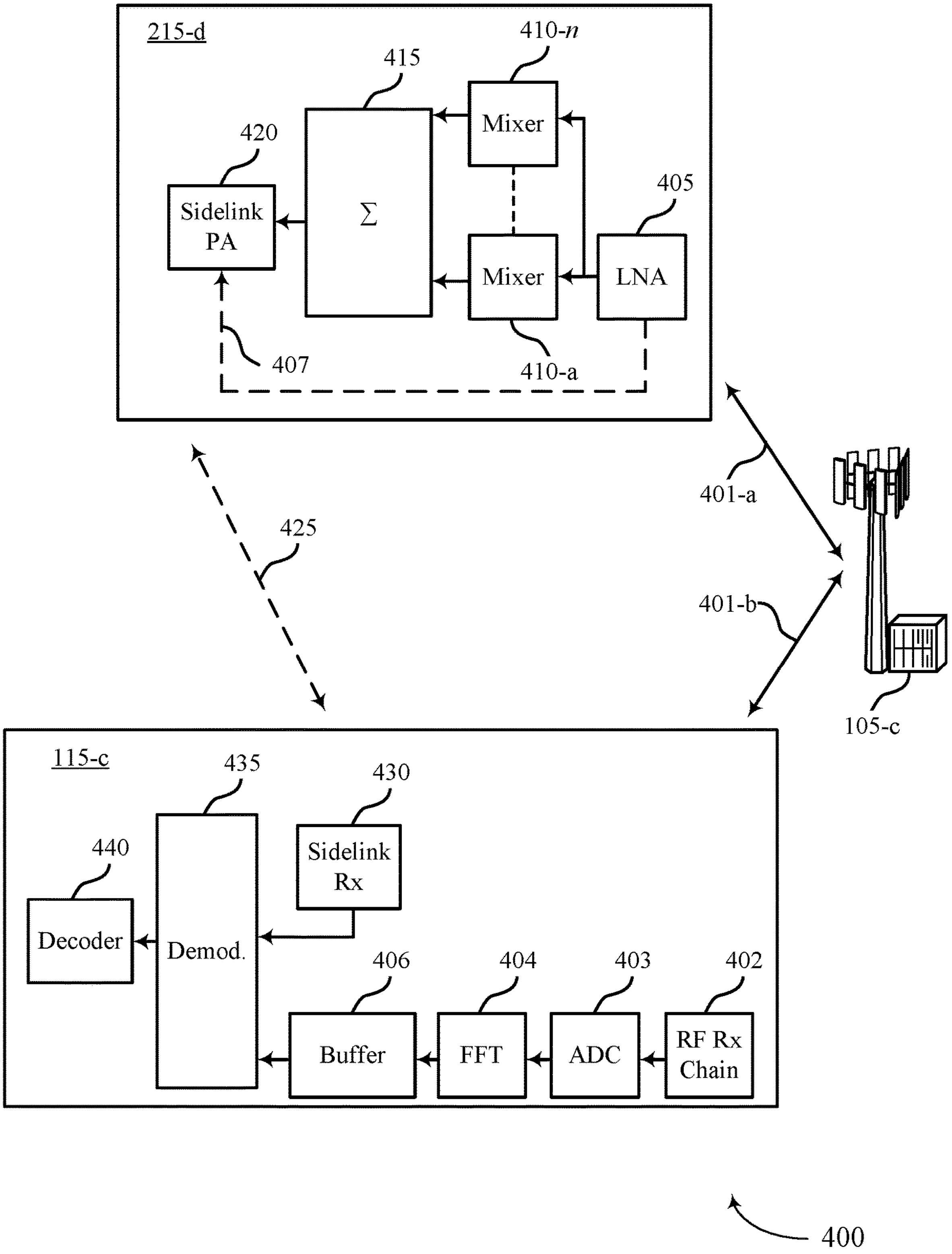

FIG. 4 shows an example of a wireless communications system 400 that supports rank augmentation using sidelink and companion devices in accordance with one or more aspects of the present disclosure. In some examples, the wireless communications system 400 may implement or be implemented by aspects of the wireless communications systems 100 and 200. For example, the wireless communications system 400 may include one or more network entities 105 (e.g., network entity 105-*c*) and one or more UEs 115 (e.g., UE 115-*c*), which may be examples of the corresponding devices as described with reference to FIGS. 1 and 2. In some examples, a wireless device 215-*c* may transmit RF-adjusted signals to, or receive RF-adjusted signals from, the UE 115-*b* via a sidelink 425 based on communications from the network entity 105-*c* via an access link 401-*a* or an access link 401-*b*. One example of an access link 401 is a Uu interface. FIG. 4 illustrates an example of rank augmentation using RF conversion at the wireless device 215-*d* to support channel rank augmentation for signals intend for communication between the UE 115-*c* and the network entity 105-*c*.

In a downlink scenario, the wireless device 215-*d* may be configured to perform one or more RF adjustments to communications (e.g., MIMO) received from the network entity and send the adjusted signals to the UE 115-*c*. For example, the wireless device 215-*d* may include a low noise amplifier (LNA) 405, one or more mixers 410, a summation module 415, and a sidelink power amplifier (PA) 420. The wireless device 215-*d* may receive communications (e.g., MIMO signals) from the network entity 105-*c* via the access link 401-*a*, and in some cases, the communications may be intended for the UE 115-*c*. One example RF adjustment includes the LNA 405 amplifying the received signal. In some cases, the wireless device 215-*d* may apply the one or more RF adjustments per receiver antenna in the wireless device 215-*d*. As such, additional RF components (e.g., LNA 405) may be included for each antenna in the wireless device 215-*d*. As another example of an RF adjustment, the one or more mixers 410 (e.g., the mixer 410-*a* to the mixer 410-*n*, where n may represent a positive integer) may convert the amplified communications to a sidelink carrier frequency (e.g., UWB carrier), duplicate the amplified communications over multiple contiguous carrier frequencies, or any combination thereof. For example, the wireless device 215-*d*, or the UE 115-*c* via control signaling, may tune each mixer of the one or more mixers 410 for a local oscillator (LO) frequency equal to a difference between a carrier frequency for an n-th sidelink carrier and the carrier frequency for the access link 401-*a* or the access link 401-*b* (e.g., $LO=F_{UWB,n}-F_{Uu}$). In some cases, the summation module 415 may combine the output of the one or more mixers 410.

As another example of an RF adjustment, the sidelink PA 420 may amplify the output of the summation module 415 based on a power control feedback loop 407. For example, the power control feedback loop 407 may adjust a power amplification of the sidelink PA 420 based on a received signal strength indicator (RSSI) analog measurement (e.g., an RSSI based on the communications received at the LNA 405). In some cases, the power control feedback loop 407 may adjust the power amplification of the sidelink PA 420 such that the output of the sidelink PA 420 satisfies a threshold (e.g., such that the output is compliant with a physical downlink shared channel (PDSCH) while complying to UWB power and contiguous frequency chunk thresholds). The wireless device 215-*d* may transmit the RF-adjusted communications (e.g., the output of the sidelink PA 420) to the UE 115-*c* via the sidelink 425.

The UE 115-*b* may include an RF receiver chain 402, an ADC 403, an FFT module 404, a buffer 406, a sidelink receiver 430, a demodulator 435, and a decoder 440. In some cases, the RF receiver chain 402 may receive communications (e.g., MIMO signals) from the network entity 105-*c* via the access link 401-*b*. In some examples, the RF receiver chain 402 may output the received communications to the ADC 403, and the ADC 403 may convert the received signaling from an analog domain to a digital domain. In some cases, the FFT module 404 may perform an FFT on the digital-domain received communications.

In some examples, the sidelink receiver 430 may receive the RF-adjusted communications via the sidelink 425, and the sidelink receiver 430 may combine a portion of carrier frequency replicas in the RF-adjusted communications (e.g., the sidelink receiver 430 may combine all carrier replicas to support an improvement of the received signal SNR). In some examples, the demodulator 435 may demodulate the RF-adjusted communications as well as the signals received via the RF receiver chain 402. In some cases, the UE 115-*c* may process the RF-adjusted communications in conjunction with the communications (e.g., MIMO signals) received at the RF receiver chain 402 (e.g., the UE 115-*c* may process the RF-adjusted communications as if they were received from additional antennae of the UE 115-*c*). In some examples, the buffer 406 may enable support for latency in the sidelink 425. For example, the buffer 406 may enable the UE 115-*c* to process the communications (e.g., in the demodulator 435) received at the RF receiver chain 402 and the RF-adjusted communications received at the sidelink receiver 430. That is, the buffer 406 may store the signals received from the receiver chain 402 until the signals are ready for processing in conjunction with the signals received from the wireless device 215-*d* via the sidelink receiver 430 (e.g., to account for latency for communications via the sidelink 330).

In an uplink scenario, the UE 115-*c* may transmit communications to the wireless device 215-*d* via the sidelink 425 such that the wireless device 215-*d* may perform RF adjustments and transmit adjusted signals (e.g., MIMO signals) to the network entity 105-*c*. In such examples, the wireless device 215-*d* may communicate with the network entity 105-*c* via the access link 401-*a* based on the RF-adjusted communications. In some cases, the UE 115-*c* may transmit, via the sidelink 425, timing instructions such that the uplink communications are synchronized. For example, the UE 115-*c* may transmit timing instructions such that the over-the-air signal timing difference between the UE 115-*c* and the wireless device 215-*d* satisfy a threshold duration (e.g., below a duration of a CP).

Figure 5:
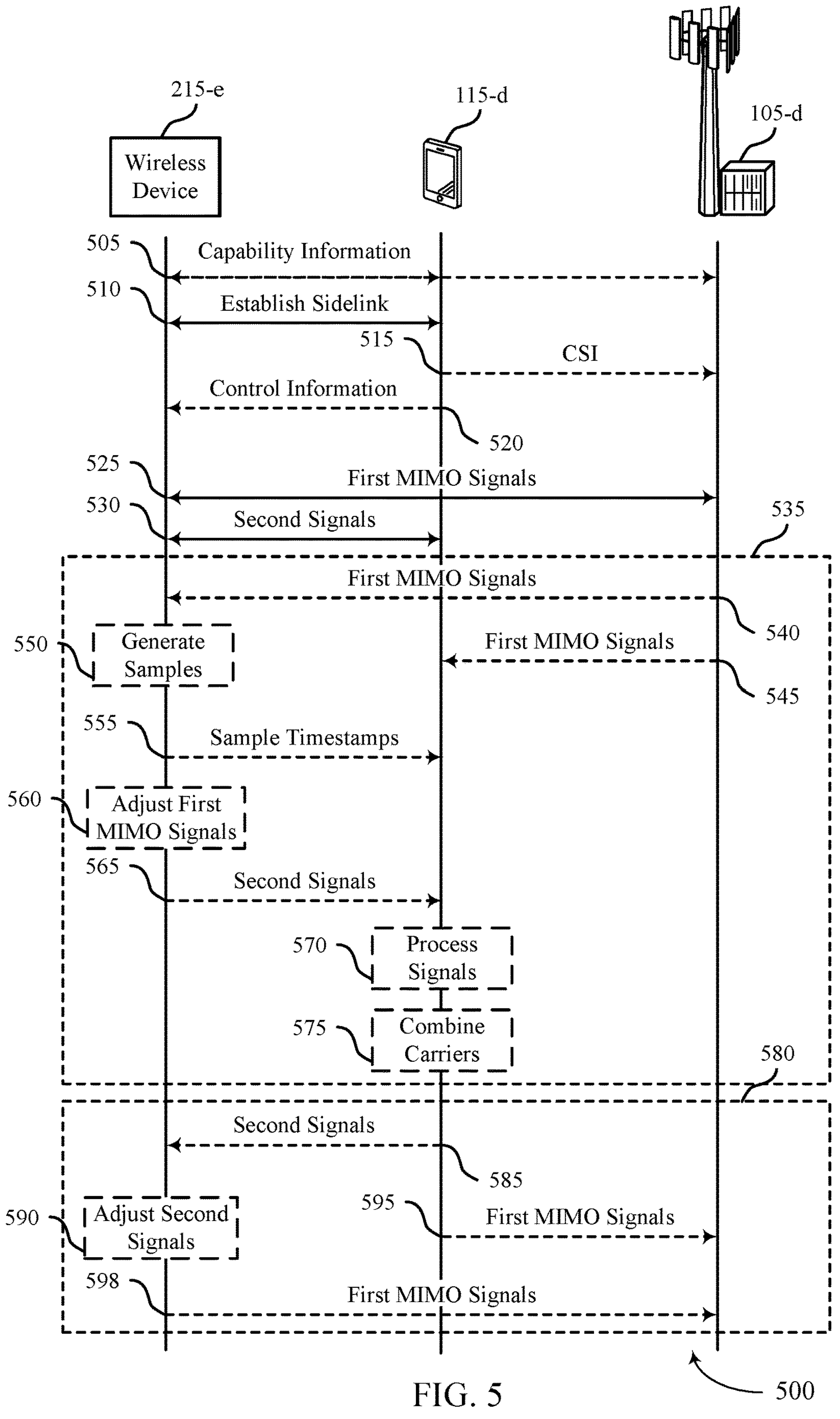
FIG. 5 shows an example of a process flow that supports rank augmentation using sidelink and companion devices in accordance with one or more aspects of the present disclosure.

FIG. 5 shows an example of a process flow 500 that supports rank augmentation using sidelink and companion devices in accordance with one or more aspects of the present disclosure. The process flow 500 may be performed by aspects of the wireless communications system 100 or the wireless communications system 200, as described herein with reference to FIGS. 1 and 2. For example, a wireless device 215-*e*, a UE 115-*d*, and a network entity 105-*d*, which may be examples of a wireless device 215, a UE 115, and a network entity 105 as described herein, may perform aspects of the process flow 500. In some examples, the wireless device 215-*e* may include XR eyewear, a smartwatch, or a second UE 115. In the following description of the process flow 500, operations performed by the wireless device 215-*e*, the UE 115-*d*, and the network entity 105-*d* may be performed in a different order than is shown. Some operations may be omitted from the process flow 500, and other operations may be added to the process flow 500. Further, although some operations or signaling may be shown to occur at different times for discussion purposes, these operations may occur at the same time.

In some examples, at 505, the wireless device 215-*e* or the UE 115-*d* may transmit capability information associated with the wireless device 215-*e* and the UE 115-*d* enabling a second channel rank. In some cases, the wireless device 215-*e* may transmit the capability information to the UE 115-*d*, the network entity 105-*d*, or both. Additionally, or alternatively, the UE 115-*d* may transmit the capability information to the wireless device 215-*e*, the network entity 105-*d*, or both. In some cases, the capability information may include an indication of a duration associated with communicating via an access link (e.g., a Uu interface) with the network entity 105-*d*, a feedback response duration, a quantity of antennas associated with the wireless device 215-*e* and the UE 115-*d*, or any combination thereof.

At 510, the wireless device 215-*e* and the UE 115-*d* may establish a sidelink that may be configured to enable the second channel rank between the UE 115-*d* and the network entity 105-*d*. The sidelink may be an example of a UWB sidelink or another type of sidelink. In some examples, the UE 115-*d* may enable a first channel rank for communications between the UE 115-*d* and the network entity 105-*d*. In some cases, the second channel rank may be greater than the first channel rank. In some examples, the wireless device 215-*e* may enable a third channel rank for the access link between the wireless device 215-*e* and the network entity 105-*d*. In some cases, the second channel rank may be based on a combination of the first channel rank and the third channel rank. Additionally, or alternatively, the second channel rank may be based on a combined antenna count of a first set of antennas at the wireless device 215-*e* and a second set of antennas at the UE 115-*d*.

In some cases, at 515, the UE 115-*d* may transmit CSI. In some examples, the CSI may include an indication of the second channel rank for communications between the UE 115-*d* and the network entity 105-*d*. In some examples, at 520, the UE 115-*d* may transmit control information. In some cases, the control information may include timing information for communicating one or more first MIMO signals, one or more quantization parameters for quantizing samples of the one or more first MIMO signals, or both.

At 525, the wireless device 215-*e* or the UE 115-*d* may communicate, via an access link (e.g., a Uu interface) with the network entity 105-*d* and based on establishing the sidelink, the one or more first MIMO signals. In some examples, the one or more first MIMO signals may be intended for communications between the UE 115-*d* and the network entity 105-*d* utilizing the second channel rank. That is, the one or more first MIMO signals be signals generated by the UE 115-*d* (e.g., in an uplink scenario) and intended to be received by the network entity 105-*d* from the UE 115-*d*. However, as described herein, the UE 115-*d* and the wireless device 215-*e* may support transmission of the one or more first MIMO signals to support the second channel rank. Similarly, in a downlink scenario, the network entity 105-*d* may transmit the one or more first MIMO signals intended for receipt by the UE 115-*d*. However, as described herein, the UE 115-*d* and the wireless device 215-*e* may support receipt of the one or more first MIMO signals to support the second channel rank. In some cases, the wireless device 215-*e* may communicate the one or more first MIMO signals in accordance with the control information.

At 530, the wireless device 215-*e* or the UE 115-*d* may communicate, via the sidelink, one or more second signals based on the one or more first MIMO signals intended for the communications between the UE 115-*d* and the network entity 105-*d* utilizing the second channel rank. For example, in the uplink scenario, the one or more second signals may be samples of the one or more first MIMO signals or RF signals generated by the UE 115-*d*, and the wireless device 215-*e* may generate corresponding one or more first MIMO signals based on the received samples and communicate the corresponding one or more first MIMO signals to the network entity 105-*d*. Similarly, in a downlink scenario, the wireless device 215-*e* may receive the one or more first MIMO signals from the network entity and communicate corresponding signals (e.g., RF adjusted signals or quantized values) to the UE 115-*d* via the sidelink for processing in conjunction with the corresponding one or more first MIMO signals received by the network entity 105-*d*. In some cases, the wireless device 215-*e* may communicate the one or more second signals in accordance with the control information.

In some cases, the one or more first MIMO signals communicated between the wireless device 215-*e* and the network entity 105-*d* may supplement one or more additional first MIMO signals between the UE 115-*d* and the network entity 105-*d*. Additionally, or alternatively, the one or more first MIMO signals communicated between the UE 115-*d* and the network entity 105-*d* may supplement one or more additional first MIMO signals between the wireless device 215-*e* and the network entity 105-*d*. More particularly, the one or more first MIMO signals communicated between the UE 115-*d* and the network entity 105-*d* may be the same as (e.g., copies of) the one or more first MIMO signals communicated between wireless device 215-*e* and the network entity 105-*d*. In some cases, the one or more first MIMO signals communicated by the wireless device 215-*e* to the network entity 105-*d* may be based on (e.g., generated based on information received from the UE 115-*d* the one or more first MIMO signals to be transmitted by the UE 115-*d* to the network entity 105-*d*, and the information is obtained based on the one or more first MIMO signals to be transmitted by the UE 115-*d* to the network entity 105-*d*. Thus, such signals (e.g., RF adjusted signals) communicated by the wireless device 215-*a* supplement the signals communicated by the UE 115-*d*. Similarly, the downlink scenarios, the MIMO signals received by the UE 115-*d* and the wireless device 215-*e* supplement one another in that they may include similar or the same information but may be received in accordance with different channel conditions. Additionally, or alternatively, the one or more first MIMO signals communicated by the UE 115-*d* and the wireless device 215-*e* may be considered partial but supplementary MIMO signals, individually. Thus, when combined, the receiver (e.g., UE 115-*d* or network entity 105-*d*) may combine the partial signals to obtain the information encoded therein.

In some examples, the communication of the one or more first MIMO signals via the access link and the communication of the one or more second signals via the sidelink may include downlink procedures 535. For example, at 540, the wireless device 215-*e* may receive, via the access link with the network entity 105-*d*, the one or more first MIMO signals. In some examples, at 545, the UE 115-*d* may receive the one or more first MIMO signals via the access link with the network entity 105-*d*.

In some examples, at 550, the wireless device 215-*e* may generate a set of samples of the one or more first MIMO signals. In some cases, at 555, the wireless device 215-*e* may transmit, via the sidelink with the UE 115-*d*, respective timestamps for each sample of the set of samples. In some examples, each respective timestamp may support synchronization of the one or more first MIMO signals between the wireless device 215-*e* and the UE 115-*d*.

In some other examples, at 560, the wireless device 215-*e* may apply one or more RF adjustments to the one or more first MIMO signals. For example, the wireless device 215-*e* may convert the one or more first MIMO signals from a first carrier frequency to a second carrier frequency, duplicate the one or more first MIMO signals over multiple contiguous carrier frequencies, amplify the one or more first MIMO signals, or any combination thereof. In some cases, the wireless device 215-*e* may apply at least one respective frequency adjustment at each antenna in the wireless device 215-*e*.

In some examples, at 565, the wireless device 215-*e* may transmit, via the sidelink with the UE 115-*d*, the one or more second signals. In some cases, the one or more second signals may include the set of samples of the one or more first MIMO signals. In some other cases, the wireless device 215-*e* may transmit the one or more second signals based on the one or more RF adjustments.

At 570, the UE 115-*d* may process the one or more first MIMO signals in combination with the one or more second signals. In some cases, the UE 115-*d* may process the one or more first MIMO signals in combination with the one or more second signals based on the respective timestamps. In some examples, at 575, the UE 115-*d* may combine multiple carrier frequencies associated with the one or more second signals and the one or more first MIMO signals received at the UE 115-*d*.

In some examples, the communication of the one or more first MIMO signals via the access link and the communication of the one or more second signals via the sidelink may include uplink procedures 580. For example, at 585, the UE 115-*d* may transmit, via the sidelink with the wireless device 215-*e*, the one or more second signals.

In some examples, the one or more second signals may include a set of samples corresponding to the one or more first MIMO signals. At 595, the UE 115-*d* may transmit, via the access link with the network entity 105-*d*, the one or more first MIMO signals based on the set of samples. In some cases, the one or more second signals may include timing information associated with transmitting the one or more first MIMO signals. For example, the UE 115-*d* may transmit the one or more first MIMO signals in accordance with the timing information.

At 590, the wireless device 215-*e* may apply one or more RF adjustments to the one or more second signals. In some examples, at 598, the wireless device 215-*e* may transmit, via the access link with the network entity, the one or more first MIMO signals. In some cases, the wireless device 215-*e* may transmit the one or more first MIMO signals based on the one or more RF adjustments. In some other cases, the wireless device 215-*e* may transmit the one or more first MIMO signals based on the timing information.

Figure 6:
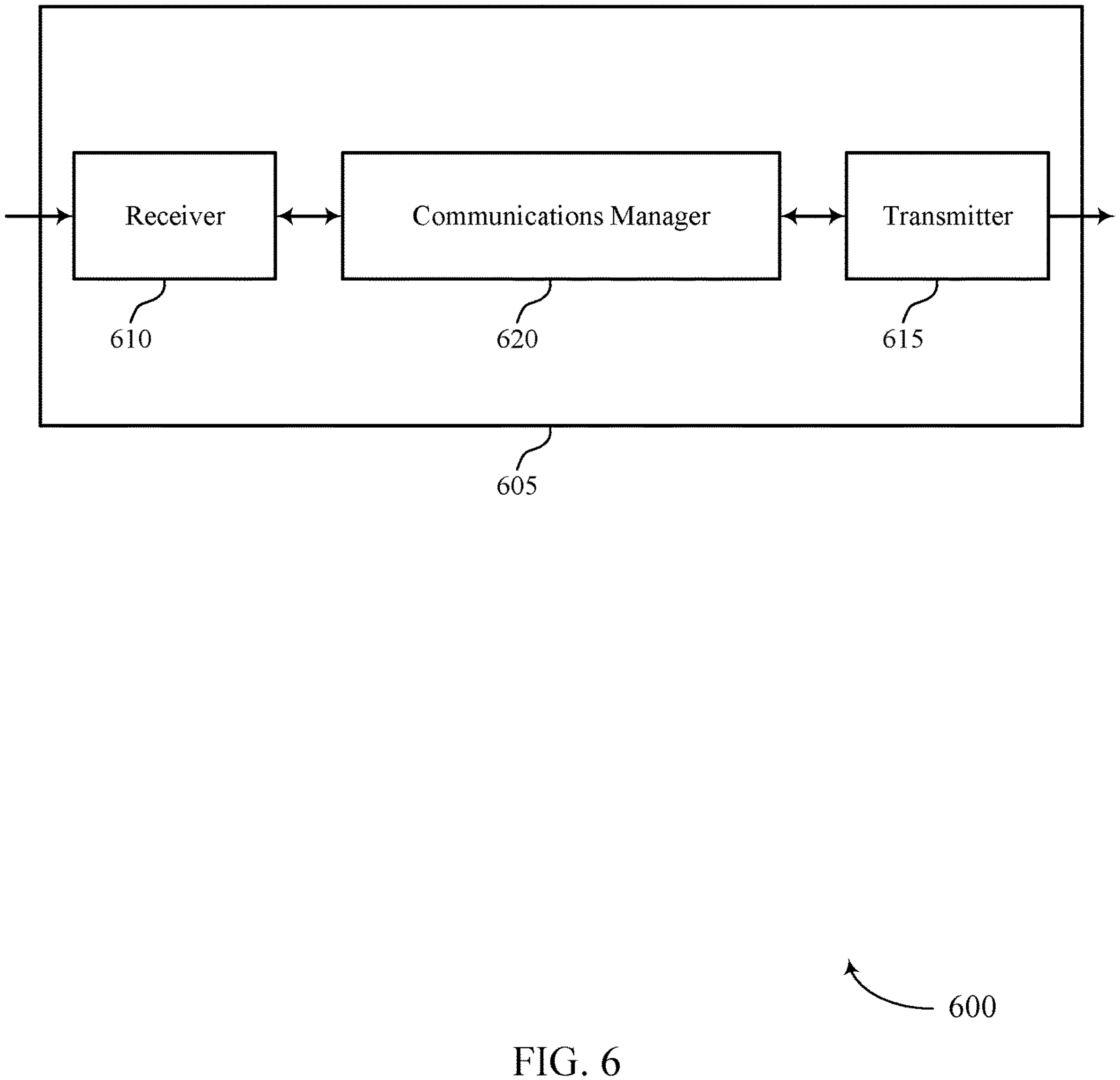
FIGS. 6 and 7 show block diagrams of devices that support rank augmentation using sidelink and companion devices in accordance with one or more aspects of the present disclosure.

FIG. 6 shows a block diagram 600 of a device 605 that supports rank augmentation using sidelink and companion devices in accordance with one or more aspects of the present disclosure. The device 605 may be an example of aspects of a wireless device (e.g., an auxiliary device or a UE) as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to rank augmentation using sidelink and companion devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to rank augmentation using sidelink and companion devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of rank augmentation using sidelink and companion devices as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for establishing, with a UE that supports a first channel rank for communications between the UE and a network entity, a sidelink that is configured to enable a second channel rank for the communications between the UE and the network entity, where the second channel rank is greater than the first channel rank. The communications manager 620 is capable of, configured to, or operable to support a means for communicating, via an access link (e.g., a Uu interface) with the network entity and based on establishing the sidelink, one or more first MIMO signals intended for communications between the UE and the network entity utilizing the second channel rank. The communications manager 620 is capable of, configured to, or operable to support a means for communicating, via the sidelink with the UE, one or more second signals that are based on the one or more first MIMO signals intended for communications between the UE and the network entity utilizing the second channel rank.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption (e.g., by increasing the channel rank to offload more tasks), and more efficient utilization of communication resources.

Figure 7:
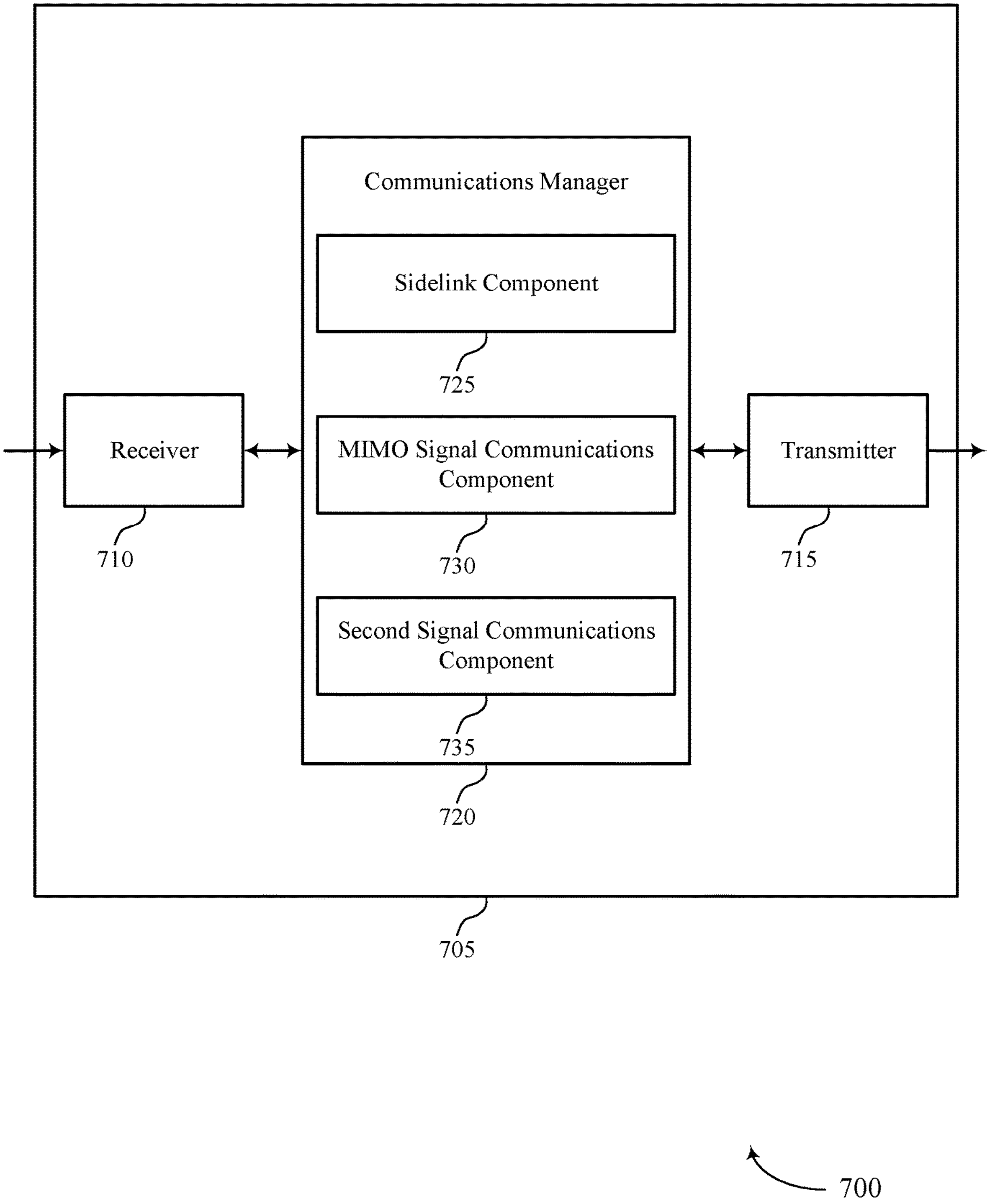

FIG. 7 shows a block diagram 700 of a device 705 that supports rank augmentation using sidelink and companion devices in accordance with one or more aspects of the present disclosure. The device 705 may be an example of aspects of a device 605, a UE 115, or one or more wireless devices 215 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to rank augmentation using sidelink and companion devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to rank augmentation using sidelink and companion devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of rank augmentation using sidelink and companion devices as described herein. For example, the communications manager 720 may include a sidelink component 725, a MIMO signal communications component 730, a second signal communications component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The sidelink component 725 is capable of, configured to, or operable to support a means for establishing, with a UE that supports a first channel rank for communications between the UE and a network entity, a sidelink that is configured to enable a second channel rank for the communications between the UE and the network entity, where the second channel rank is greater than the first channel rank. The MIMO signal communications component 730 is capable of, configured to, or operable to support a means for communicating, via an access link with the network entity and based on establishing the sidelink, one or more first MIMO signals intended for communications between the UE and the network entity utilizing the second channel rank. The second signal communications component 735 is capable of, configured to, or operable to support a means for communicating, via the sidelink with the UE, one or more second signals that are based on the one or more first MIMO signals intended for communications between the UE and the network entity utilizing the second channel rank.

Figure 8:
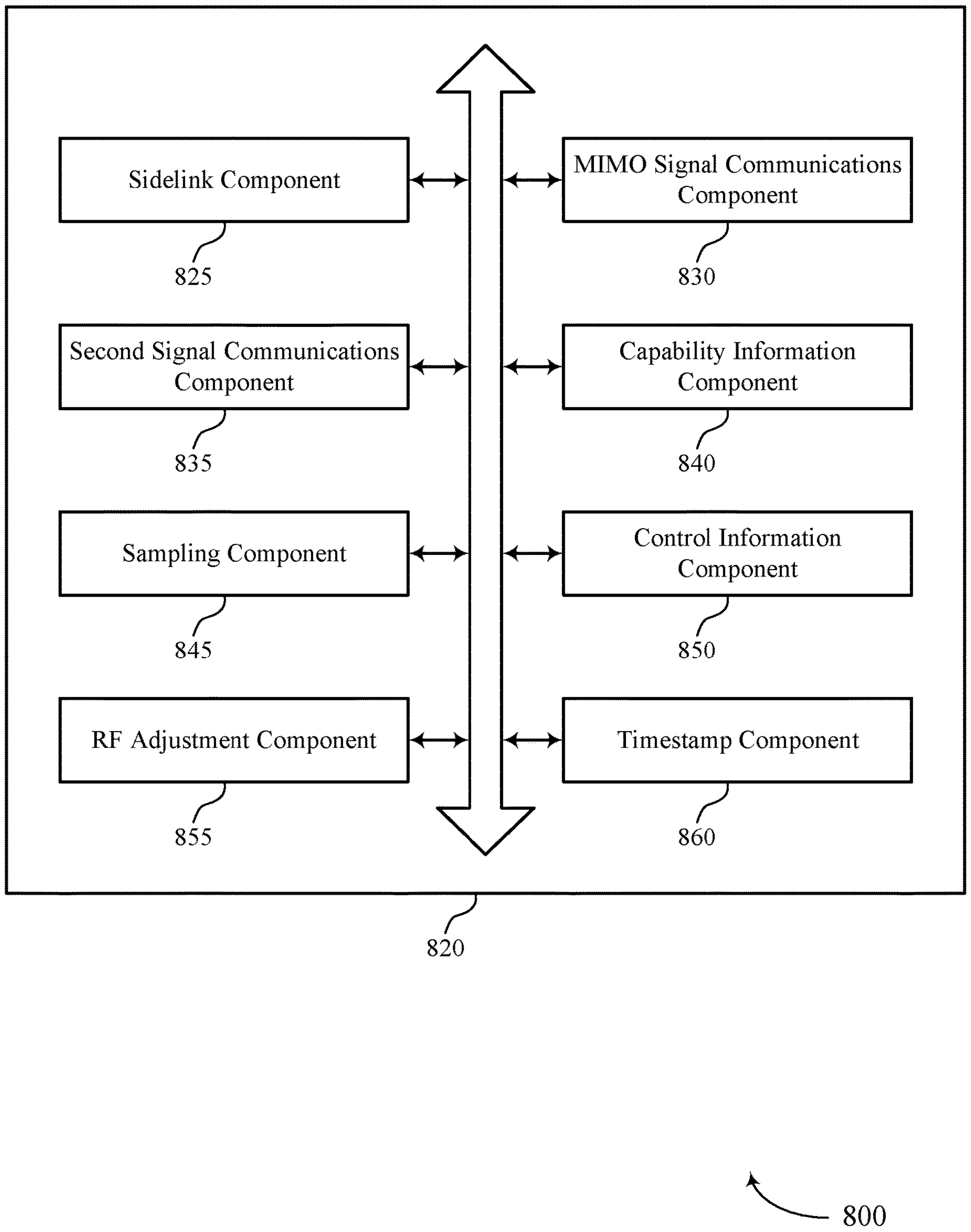
FIG. 8 shows a block diagram of a communications manager that supports rank augmentation using sidelink and companion devices in accordance with one or more aspects of the present disclosure.

FIG. 8 shows a block diagram 800 of a communications manager 820 that supports rank augmentation using sidelink and companion devices in accordance with one or more aspects of the present disclosure. The communications manager 820 may be an example of aspects of a communications manager 620, a communications manager 720, or both, as described herein. The communications manager 820, or various components thereof, may be an example of means for performing various aspects of rank augmentation using sidelink and companion devices as described herein. For example, the communications manager 820 may include a sidelink component 825, a MIMO signal communications component 830, a second signal communications component 835, a capability information component 840, a sampling component 845, a control information component 850, an RF adjustment component 855, a timestamp component 860, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The sidelink component 825 is capable of, configured to, or operable to support a means for establishing, with a UE that supports a first channel rank for communications between the UE and a network entity, a sidelink that is configured to enable a second channel rank for the communications between the UE and the network entity, where the second channel rank is greater than the first channel rank. The MIMO signal communications component 830 is capable of, configured to, or operable to support a means for communicating, via an access link with the network entity and based on establishing the sidelink, one or more first MIMO signals intended for communications between the UE and the network entity utilizing the second channel rank. The second signal communications component 835 is capable of, configured to, or operable to support a means for communicating, via the sidelink with the UE, one or more second signals that are based on the one or more first MIMO signals intended for communications between the UE and the network entity utilizing the second channel rank.

In some examples, the wireless device supports a third channel rank for the access link between the wireless device and the network entity. In some examples, the second channel rank is based on a combination of the first channel rank and the third channel rank. In some examples, the second channel rank is based on a combined antenna count of a first set of antennas at the wireless device and second set of antennas at the UE.

In some examples, the capability information component 840 is capable of, configured to, or operable to support a means for transmitting, to the UE, the network entity, or both, capability information associated with enabling the second channel rank by the wireless device and the UE.

In some examples, to support communicating the one or more first MIMO signals and the one or more second signals, the MIMO signal communications component 830 is capable of, configured to, or operable to support a means for receiving, via the access link with the network entity, the one or more first MIMO signals. In some examples, to support communicating the one or more first MIMO signals and the one or more second signals, the sampling component 845 is capable of, configured to, or operable to support a means for generating a set of samples of the one or more first MIMO signals. In some examples, to support communicating the one or more first MIMO signals and the one or more second signals, the second signal communications component 835 is capable of, configured to, or operable to support a means for transmitting, via the sidelink with the UE, the one or more second signals that include the set of samples of the one or more first MIMO signals.

In some examples, the timestamp component 860 is capable of, configured to, or operable to support a means for transmitting, via the sidelink with the UE, respective timestamps for each sample of the set of samples, where each respective timestamp supports synchronization of the one or more first MIMO signals between the wireless device and the UE.

In some examples, the control information component 850 is capable of, configured to, or operable to support a means for receiving, from the UE via the sidelink, control information including timing information for communicating the one or more first MIMO signals, one or more quantization parameters for quantizing samples of the one or more first MIMO signals, or both, where the one or more first MIMO signals, the one or more second signals, or both, are communicated in accordance with the control information.

In some examples, to support communicating the one or more first MIMO signals and the one or more second signals, the second signal communications component 835 is capable of, configured to, or operable to support a means for receiving, via the sidelink with the UE, the one or more second signals that include a set of samples corresponding to the one or more first MIMO signals. In some examples, to support communicating the one or more first MIMO signals and the one or more second signals, the MIMO signal communications component 830 is capable of, configured to, or operable to support a means for transmitting, via the access link with the network entity, the one or more first MIMO signals based on the set of samples. In some examples, the one or more second signals include timing information associated with transmitting the one or more first MIMO signals. In some examples, the one or more first MIMO signals are transmitted in accordance with the timing information.

In some examples, to support communicating the one or more first MIMO signals and the one or more second signals, the MIMO signal communications component 830 is capable of, configured to, or operable to support a means for receiving, via the access link with the network entity, the one or more first MIMO signals. In some examples, to support communicating the one or more first MIMO signals and the one or more second signals, the RF adjustment component 855 is capable of, configured to, or operable to support a means for applying one or more radio frequency adjustments to the one or more first MIMO signals. In some examples, to support communicating the one or more first MIMO signals and the one or more second signals, the second signal communications component 835 is capable of, configured to, or operable to support a means for transmitting, via the sidelink with the UE, the one or more second signals that are based on the one or more radio frequency adjustments.

In some examples, to support applying the one or more radio frequency adjustments, the RF adjustment component 855 is capable of, configured to, or operable to support a means for converting the one or more first MIMO signals from a first carrier frequency to a second carrier frequency, duplicating the one or more first MIMO signals over a set of multiple contiguous carrier frequencies, amplifying the one or more first MIMO signals, or any combination thereof. In some examples, to support applying the one or more radio frequency adjustments to the one or more first MIMO signals, the RF adjustment component 855 is capable of, configured to, or operable to support a means for applying at least one respective frequency adjustment at each antenna in the wireless device.

In some examples, to support communicating the one or more first MIMO signals and the one or more second signals, the second signal communications component 835 is capable of, configured to, or operable to support a means for receiving, via the sidelink with the UE, the one or more second signals corresponding to the one or more first MIMO signals. In some examples, to support communicating the one or more first MIMO signals and the one or more second signals, the RF adjustment component 855 is capable of, configured to, or operable to support a means for applying one or more radio frequency adjustments to the one or more second signals. In some examples, to support communicating the one or more first MIMO signals and the one or more second signals, the MIMO signal communications component 830 is capable of, configured to, or operable to support a means for transmitting, via the access link with the network entity, the one or more first MIMO signals based on the one or more radio frequency adjustments.

In some examples, the one or more first MIMO signals communicated between the wireless device and the network entity supplement one or more additional first MIMO signals communicated between the UE and the network entity. In some examples, the wireless device includes extended reality eyewear or a smartwatch. In some examples, the wireless device is a second UE.

Figure 9:
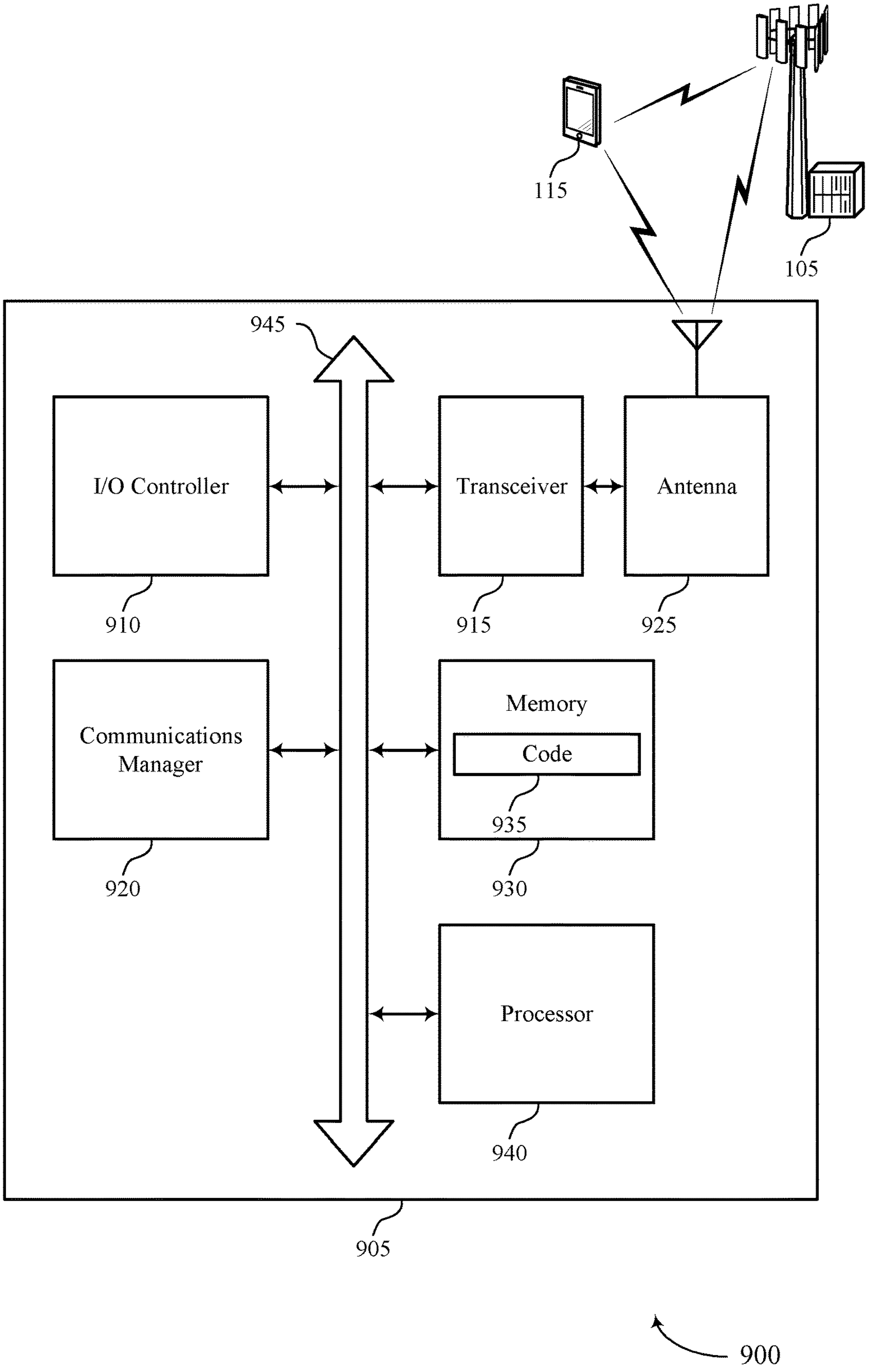
FIG. 9 shows a diagram of a system including a wireless device that supports rank augmentation using sidelink and companion devices in accordance with one or more aspects of the present disclosure.

FIG. 9 shows a diagram of a system 900 including a device 905 that supports rank augmentation using sidelink and companion devices in accordance with one or more aspects of the present disclosure. The device 905 may be an example of or include the components of a device 605, a device 705, or one or more wireless devices 215 as described herein. The device 905 may include components for bi-directional voice and data communications including components for transmitting and receiving communications, such as a communications manager 920, an I/O controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include RAM and ROM. The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a BIOS which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting rank augmentation using sidelink and companion devices). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for establishing, with a UE that supports a first channel rank for communications between the UE and a network entity, a sidelink that is configured to enable a second channel rank for the communications between the UE and the network entity, where the second channel rank is greater than the first channel rank. The communications manager 920 is capable of, configured to, or operable to support a means for communicating, via an access link with the network entity and based on establishing the sidelink, one or more first MIMO signals intended for communications between the UE and the network entity utilizing the second channel rank. The communications manager 920 is capable of, configured to, or operable to support a means for communicating, via the sidelink with the UE, one or more second signals that are based on the one or more first MIMO signals intended for communications between the UE and the network entity utilizing the second channel rank.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices (e.g., by increasing the channel rank between devices), longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of rank augmentation using sidelink and companion devices as described herein, or the at least one processor 940 and the at least one memory 930 may be otherwise configured to, individually or collectively, perform or support such operations.

Figure 10:
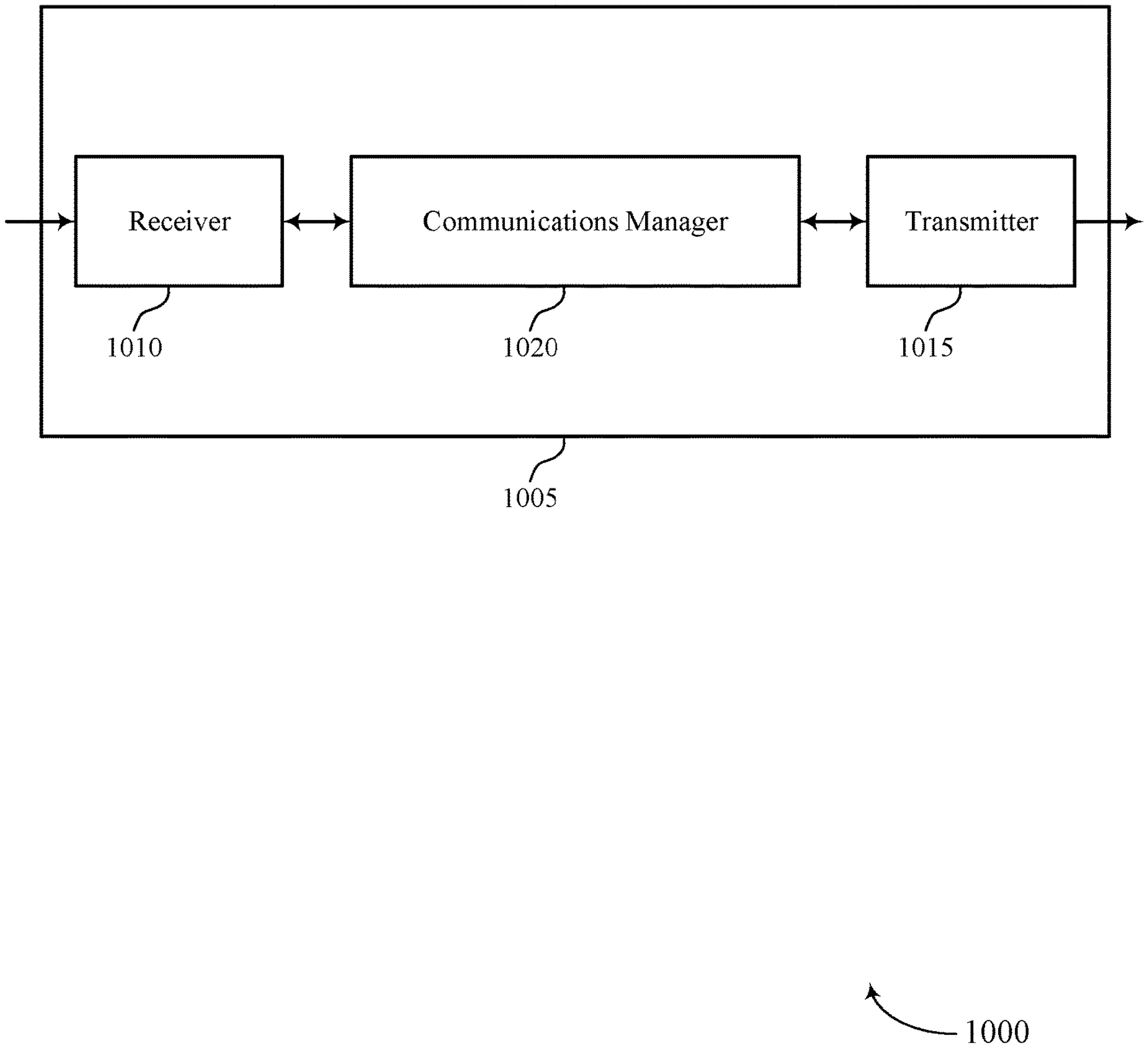
FIGS. 10 and 11 show block diagrams of devices that support rank augmentation using sidelink and companion devices in accordance with one or more aspects of the present disclosure.

FIG. 10 shows a block diagram 1000 of a device 1005 that supports rank augmentation using sidelink and companion devices in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to rank augmentation using sidelink and companion devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to rank augmentation using sidelink and companion devices). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of rank augmentation using sidelink and companion devices as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for establishing, with a wireless device, a sidelink that is configured to enable a second channel rank for communications between the UE and a network entity, where the UE supports a first channel rank for the communications between the UE and the network entity, and where the second channel rank is greater than the first channel rank. The communications manager 1020 is capable of, configured to, or operable to support a means for communicating, via an access link with the network entity and based on establishing the sidelink, one or more first MIMO signals intended for communications between the UE and the network entity utilizing the second channel rank. The communications manager 1020 is capable of, configured to, or operable to support a means for communicating, via the sidelink with the wireless device, one or more second signals that are based on the one or more first MIMO signals intended for communications between the UE and the network entity utilizing the second channel rank.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption (e.g., by increasing the channel rank to offload more tasks), and more efficient utilization of communication resources.

Figure 11:
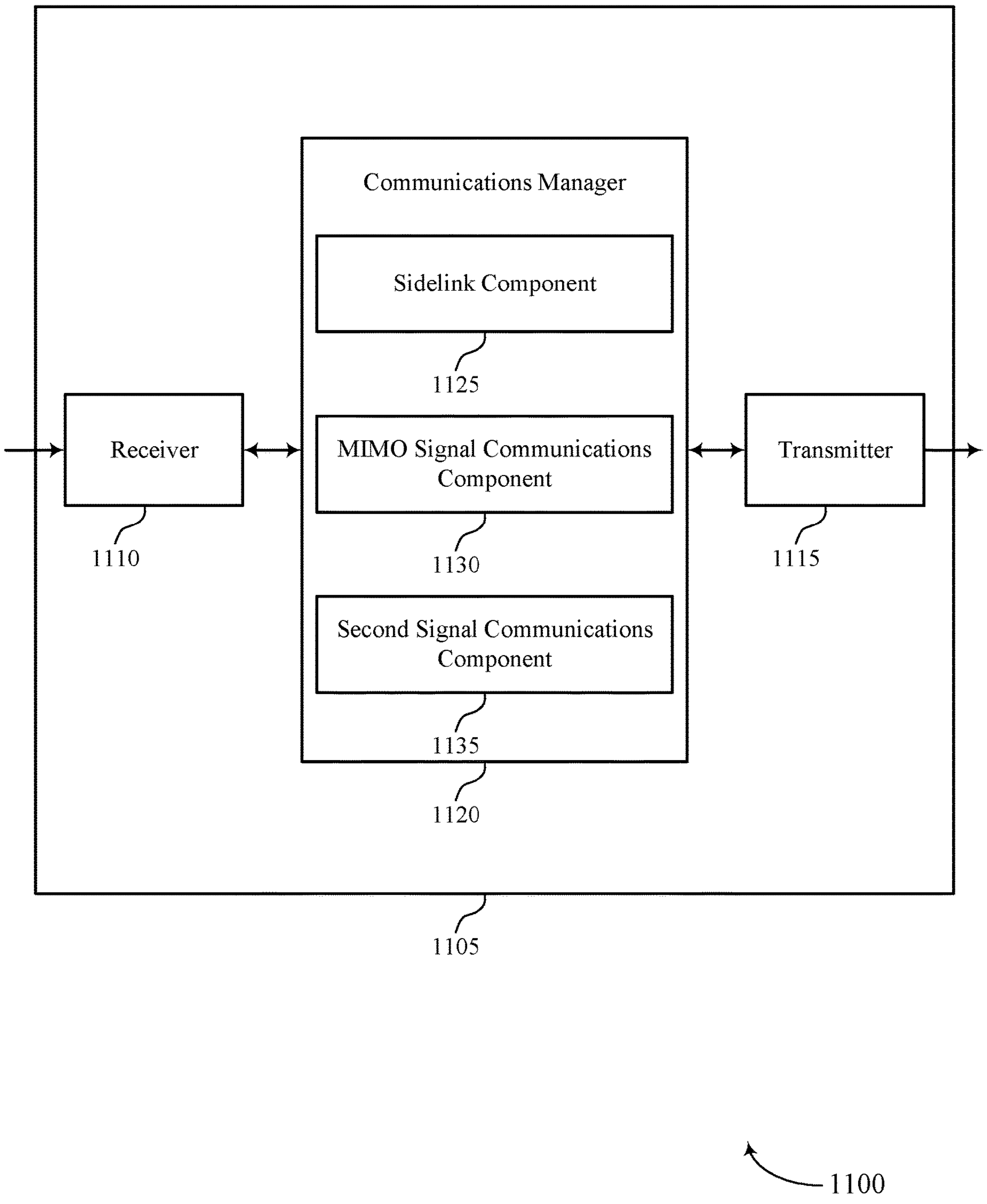

FIG. 11 shows a block diagram 1100 of a device 1105 that supports rank augmentation using sidelink and companion devices in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to rank augmentation using sidelink and companion devices). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to rank augmentation using sidelink and companion devices). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of rank augmentation using sidelink and companion devices as described herein. For example, the communications manager 1120 may include a sidelink component 1125, a MIMO signal communications component 1130, a second signal communications component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The sidelink component 1125 is capable of, configured to, or operable to support a means for establishing, with a wireless device, a sidelink that is configured to enable a second channel rank for communications between the UE and a network entity, where the UE supports a first channel rank for the communications between the UE and the network entity, and where the second channel rank is greater than the first channel rank. The MIMO signal communications component 1130 is capable of, configured to, or operable to support a means for communicating, via an access link with the network entity and based on establishing the sidelink, one or more first MIMO signals intended for communications between the UE and the network entity utilizing the second channel rank. The second signal communications component 1135 is capable of, configured to, or operable to support a means for communicating, via the sidelink with the wireless device, one or more second signals that are based on the one or more first MIMO signals intended for communications between the UE and the network entity utilizing the second channel rank.

Figure 12:
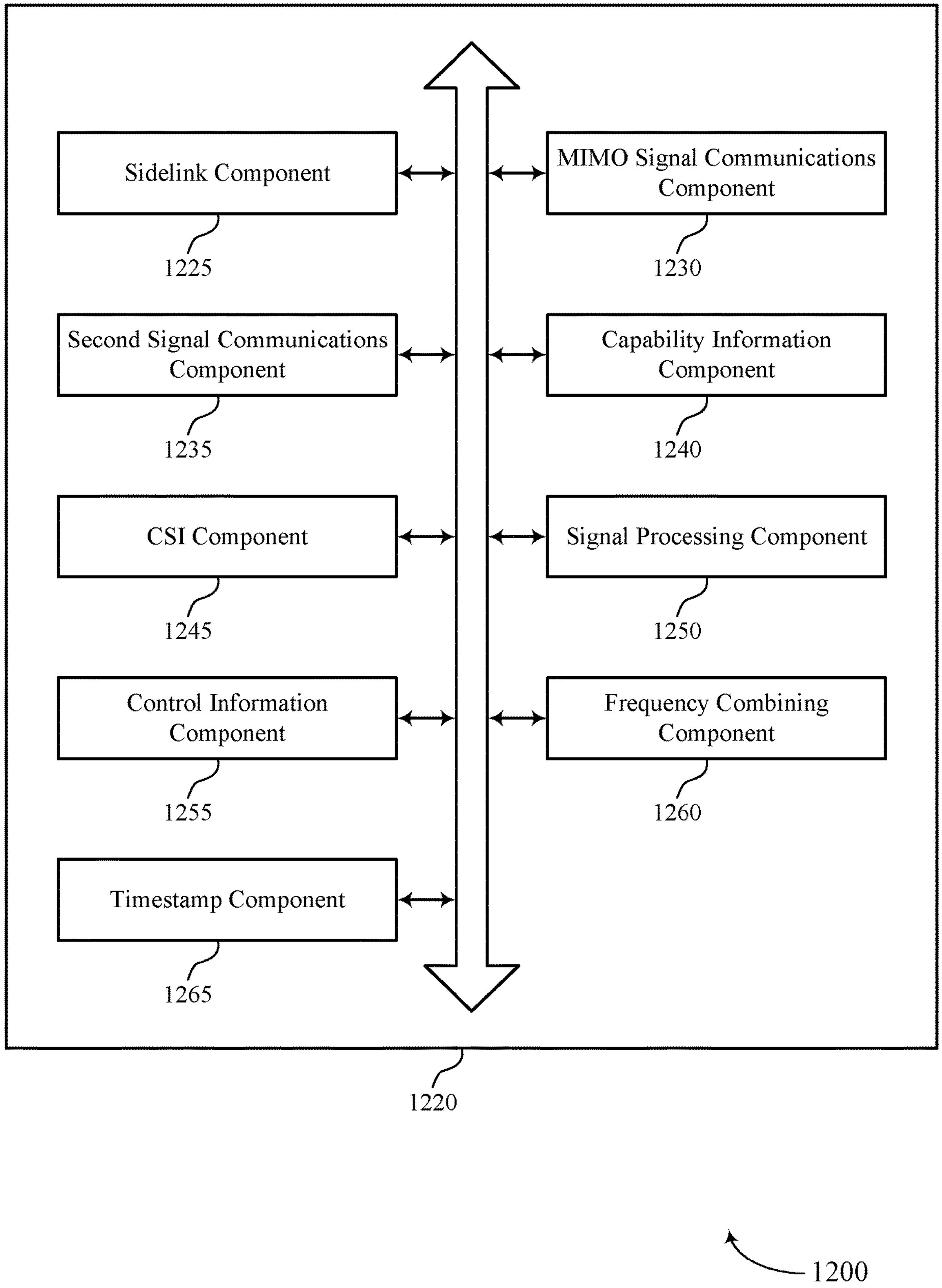
FIG. 12 shows a block diagram of a communications manager that supports rank augmentation using sidelink and companion devices in accordance with one or more aspects of the present disclosure.

FIG. 12 shows a block diagram 1200 of a communications manager 1220 that supports rank augmentation using sidelink and companion devices in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of rank augmentation using sidelink and companion devices as described herein. For example, the communications manager 1220 may include a sidelink component 1225, a MIMO signal communications component 1230, a second signal communications component 1235, a capability information component 1240, a CSI component 1245, a signal processing component 1250, a control information component 1255, a frequency combining component 1260, a timestamp component 1265, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The sidelink component 1225 is capable of, configured to, or operable to support a means for establishing, with a wireless device, a sidelink that is configured to enable a second channel rank for communications between the UE and a network entity, where the UE supports a first channel rank for the communications between the UE and the network entity, and where the second channel rank is greater than the first channel rank. The MIMO signal communications component 1230 is capable of, configured to, or operable to support a means for communicating, via an access link with the network entity and based on establishing the sidelink, one or more first MIMO signals intended for communications between the UE and the network entity utilizing the second channel rank. The second signal communications component 1235 is capable of, configured to, or operable to support a means for communicating, via the sidelink with the wireless device, one or more second signals that are based on the one or more first MIMO signals intended for communications between the UE and the network entity utilizing the second channel rank.

In some examples, the wireless device supports a third channel rank for communications between the wireless device and the network entity. In some examples, the second channel rank is based on a combination of the first channel rank and the third channel rank. In some examples, the second channel rank is based on a combined antenna count of a first set of antennas at the wireless device and second set of antennas at the UE.

In some examples, the capability information component 1240 is capable of, configured to, or operable to support a means for transmitting, to the wireless device, the network entity, or both, capability information associated with enabling the second channel rank by the wireless device and the UE. In some examples, the capability information includes an indication of a duration associated with communicating via the access link with the network entity, a feedback response duration, a quantity of antennas associated with the wireless device and the UE, or any combination thereof.

In some examples, the CSI component 1245 is capable of, configured to, or operable to support a means for transmitting, to the network entity, channel state information associated with utilizing the second channel rank for communications between the UE and the network entity.

In some examples, to support communicating the one or more first MIMO signals and the one or more second signals, the second signal communications component 1235 is capable of, configured to, or operable to support a means for receiving, via the sidelink with the wireless device, the one or more second signals including a set of samples associated with the one or more first MIMO signals. In some examples, to support communicating the one or more first MIMO signals and the one or more second signals, the MIMO signal communications component 1230 is capable of, configured to, or operable to support a means for receiving, via the access link with the network entity, the one or more first MIMO signals. In some examples, to support communicating the one or more first MIMO signals and the one or more second signals, the signal processing component 1250 is capable of, configured to, or operable to support a means for processing the one or more first MIMO signals in combination with the one or more second signals.

In some examples, the timestamp component 1265 is capable of, configured to, or operable to support a means for receiving, via the sidelink with the wireless device, respective timestamps for each sample of the set of samples, where the one or more first MIMO signals are processed in combination with the one or more second signals based on the respective timestamps. In some examples, the control information component 1255 is capable of, configured to, or operable to support a means for transmitting, to the wireless device via the sidelink, control information including timing information for communicating the one or more first MIMO signals, one or more quantization parameters for quantizing samples of the one or more first MIMO signals, or both, where the one or more second signals are received based on the control information.

In some examples, to support communicating the one or more first MIMO signals and the one or more second signals, the second signal communications component 1235 is capable of, configured to, or operable to support a means for transmitting, via the sidelink with the wireless device, the one or more second signals that include a set of samples corresponding to the one or more first MIMO signals. In some examples, to support communicating the one or more first MIMO signals and the one or more second signals, the MIMO signal communications component 1230 is capable of, configured to, or operable to support a means for transmitting, via the access link with the network entity, the one or more first MIMO signals. In some examples, the one or more second signals include timing information associated with transmitting the one or more first MIMO signals. In some examples, the one or more first MIMO signals are transmitted in accordance with the timing information.

In some examples, to support communicating the one or more first MIMO signals and the one or more second signals, the second signal communications component 1235 is capable of, configured to, or operable to support a means for receiving, via the sidelink with the wireless device, the one or more second signals that are based on the one or more first MIMO signals received by the wireless device. In some examples, to support communicating the one or more first MIMO signals and the one or more second signals, the frequency combining component 1260 is capable of, configured to, or operable to support a means for combining a set of multiple carrier frequencies associated with the one or more second signals and the one or more first MIMO signals received at the UE.

In some examples, to support communicating the one or more first MIMO signals and the one or more second signals, the second signal communications component 1235 is capable of, configured to, or operable to support a means for transmitting, via the sidelink with the wireless device, the one or more second signals that are based on the one or more first MIMO signals to be transmitted by the UE. In some examples, to support communicating the one or more first MIMO signals and the one or more second signals, the MIMO signal communications component 1230 is capable of, configured to, or operable to support a means for transmitting, via the access link with the network entity, the one or more first MIMO signals.

In some examples, the one or more first MIMO signals communicated between the UE and the network entity supplement one or more additional first MIMO signals communicated between the wireless device and the network entity. In some examples, the wireless device includes extended reality eyewear or a smartwatch. In some examples, the wireless device is a second UE.

Figure 13:
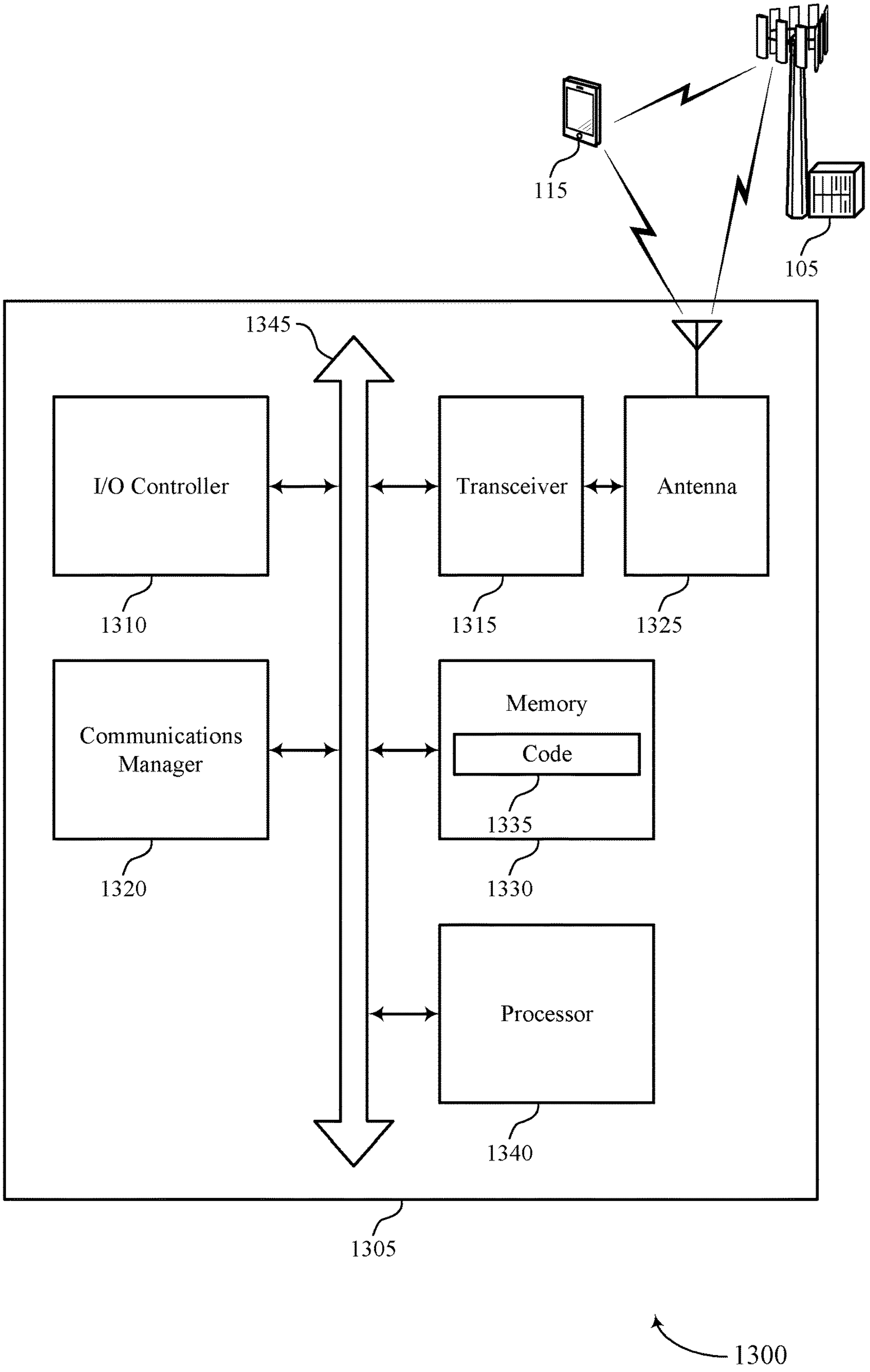
FIG. 13 shows a diagram of a system including a device that supports rank augmentation using sidelink and companion devices in accordance with one or more aspects of the present disclosure.

FIG. 13 shows a diagram of a system 1300 including a device 1305 that supports rank augmentation using sidelink and companion devices in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting rank augmentation using sidelink and companion devices). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for establishing, with a wireless device, a sidelink that is configured to enable a second channel rank for communications between the UE and a network entity, where the UE supports a first channel rank for the communications between the UE and the network entity, and where the second channel rank is greater than the first channel rank. The communications manager 1320 is capable of, configured to, or operable to support a means for communicating, via an access link with the network entity and based on establishing the sidelink, one or more first MIMO signals intended for communications between the UE and the network entity utilizing the second channel rank. The communications manager 1320 is capable of, configured to, or operable to support a means for communicating, via the sidelink with the wireless device, one or more second signals that are based on the one or more first MIMO signals intended for communications between the UE and the network entity utilizing the second channel rank.

By including or configuring the communications manager 1320 in accordance with examples as described herein, the device 1305 may support techniques for improved communication reliability, reduced latency, improved user experience related to reduced processing, reduced power consumption (e.g., by increasing the channel rank to offload more tasks), more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. For example, the communications manager 1320 may be configured to receive or transmit messages or other signaling as described herein via the transceiver 1315. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of rank augmentation using sidelink and companion devices as described herein, or the at least one processor 1340 and the at least one memory 1330 may be otherwise configured to, individually or collectively, perform or support such operations.

Figure 14:
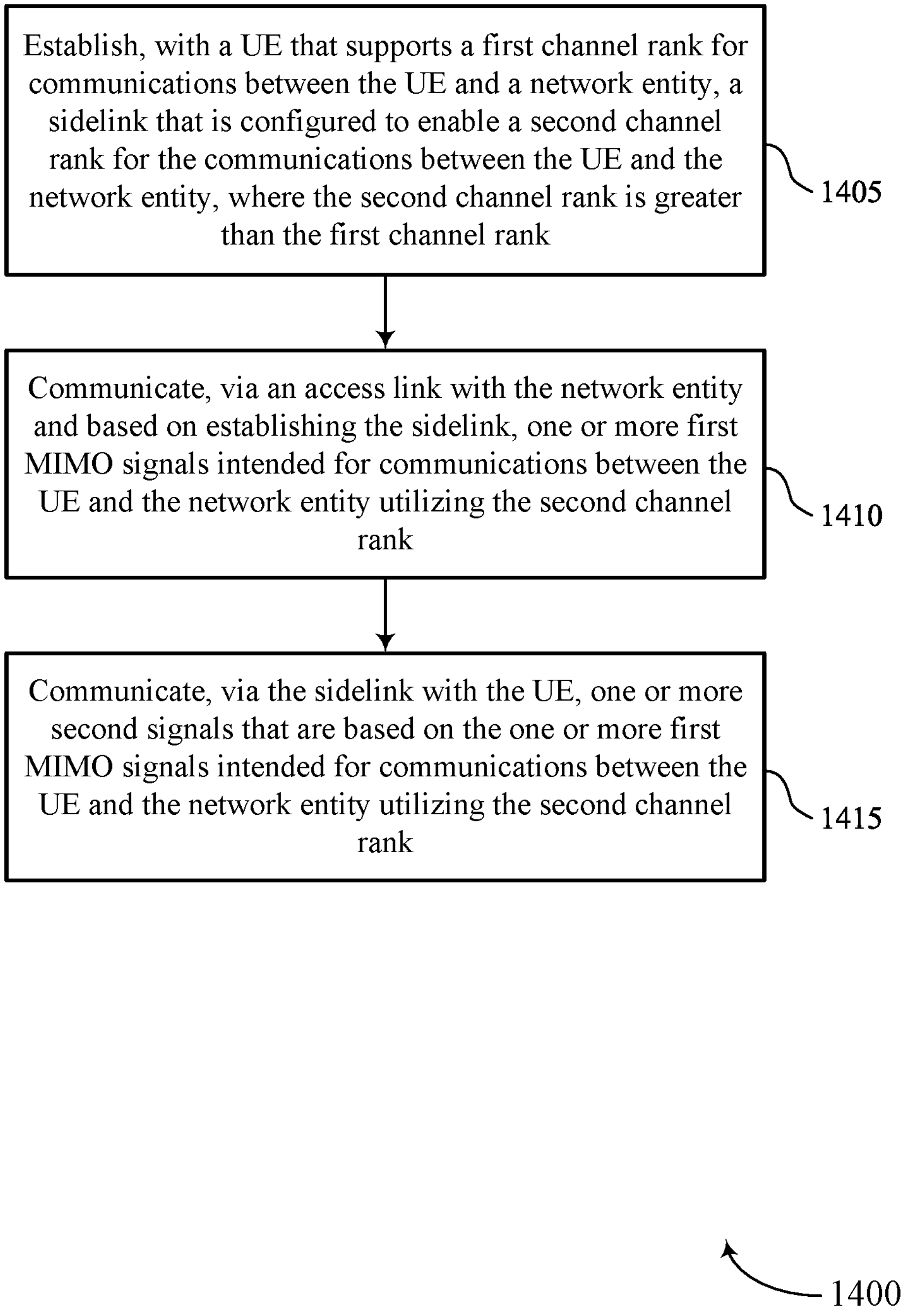
FIGS. 14 through 17 show flowcharts illustrating methods that support rank augmentation using sidelink and companion devices in accordance with one or more aspects of the present disclosure.

FIG. 14 shows a flowchart illustrating a method 1400 that supports rank augmentation using sidelink and companion devices in accordance with aspects of the present disclosure. The operations of the method 1400 may be implemented by a wireless device or its components as described herein. For example, the operations of the method 1400 may be performed by a UE 115 or one or more wireless devices 215 as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1405, the method may include establishing, with a UE that supports a first channel rank for communications between the UE and a network entity, a sidelink that is configured to enable a second channel rank for the communications between the UE and the network entity, where the second channel rank is greater than the first channel rank. The operations of block 1405 may be performed in accordance with examples as disclosed herein. In some examples, aspects of the operations of 1405 may be performed by a sidelink component 825 as described with reference to FIG. 8. In some cases, means for performing the operations of 1405 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1405 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1410, the method may include communicating, via an access link with the network entity and based on establishing the sidelink, one or more first MIMO signals intended for communications between the UE and the network entity utilizing the second channel rank. The operations of block 1410 may be performed in accordance with examples as disclosed herein. In some examples, aspects of the operations of 1410 may be performed by a MIMO signal communications component 830 as described with reference to FIG. 8. In some cases, means for performing the operations of 1410 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1410 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1415, the method may include communicating, via the sidelink with the UE, one or more second signals that are based on the one or more first MIMO signals intended for communications between the UE and the network entity utilizing the second channel rank. The operations of block 1415 may be performed in accordance with examples as disclosed herein. In some examples, aspects of the operations of 1415 may be performed by a second signal communications component 835 as described with reference to FIG. 8. In some cases, means for performing the operations of 1415 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1415 at a UE 115 may include, for example, one or more antennas 1325, a transceiver 1315, a communications manager 1320, one or more memories 1330 (e.g., including code 1335), one or more processors 1340, one or more buses 1345, or any combination thereof.

Figure 15:
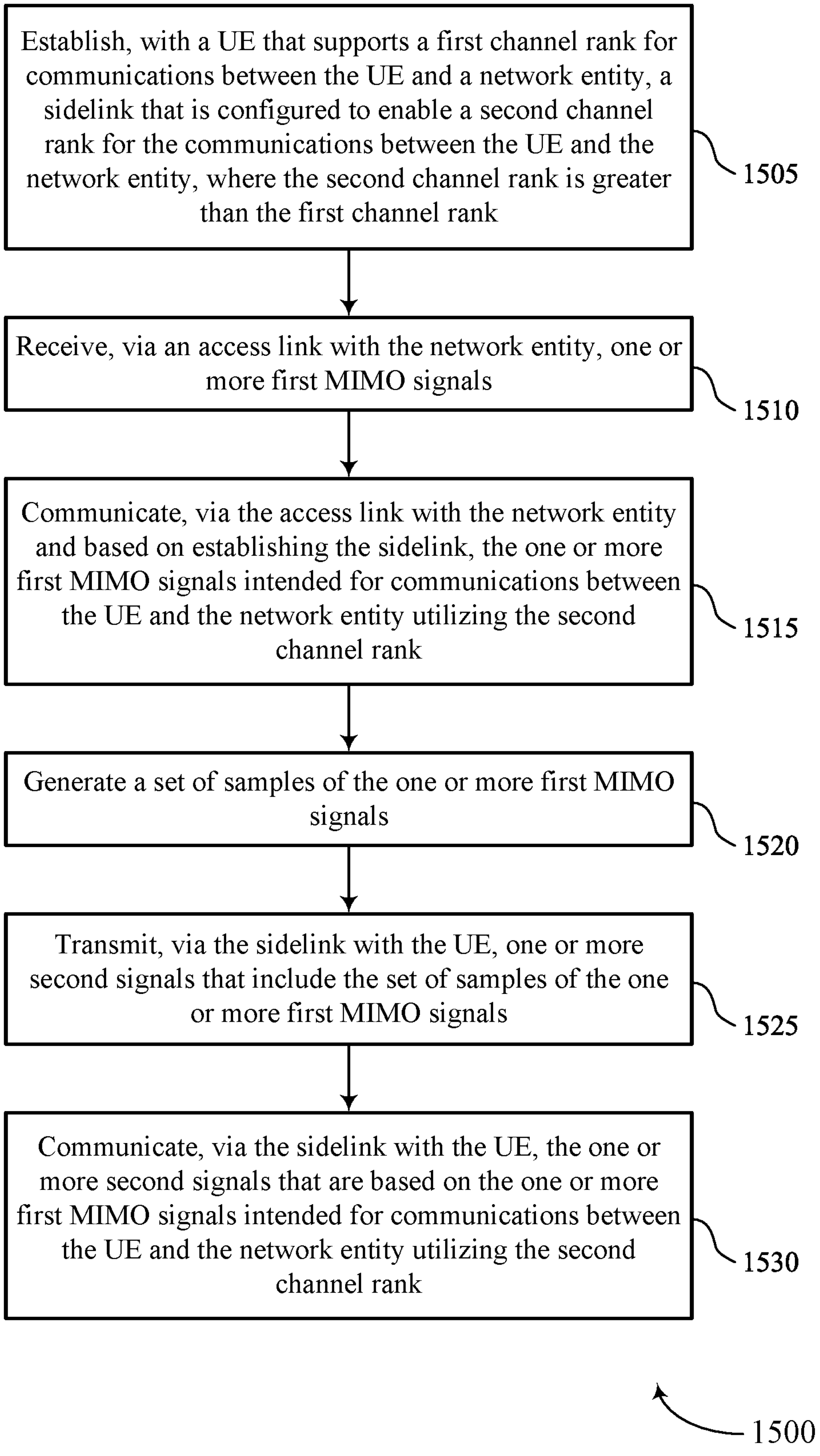

FIG. 15 shows a flowchart illustrating a method 1500 that supports rank augmentation using sidelink and companion devices in accordance with aspects of the present disclosure. The operations of the method 1500 may be implemented by a wireless device or its components as described herein. For example, the operations of the method 1500 may be performed by a UE 115, or a wireless device 215, as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1505, the method may include establishing, with a UE that supports a first channel rank for communications between the UE and a network entity, a sidelink that is configured to enable a second channel rank for the communications between the UE and the network entity, where the second channel rank is greater than the first channel rank. The operations of block 1505 may be performed in accordance with examples as disclosed herein. In some examples, aspects of the operations of 1505 may be performed by a sidelink component 825 as described with reference to FIG. 8. In some cases, means for performing the operations of 1505 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1505 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1510, the method may include receiving, via an access link with the network entity, one or more first MIMO signals. The operations of block 1510 may be performed in accordance with examples as disclosed herein. In some examples, aspects of the operations of 1510 may be performed by a MIMO signal communications component 830 as described with reference to FIG. 8. In some cases, means for performing the operations of 1510 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1510 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1515, the method may include communicating, via the access link with the network entity and based on establishing the sidelink, the one or more first MIMO signals intended for communications between the UE and the network entity utilizing the second channel rank. The operations of block 1515 may be performed in accordance with examples as disclosed herein. In some examples, aspects of the operations of 1515 may be performed by a MIMO signal communications component 830 as described with reference to FIG. 8. In some cases, means for performing the operations of 1515 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1515 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1520, the method may include generating a set of samples of the one or more first MIMO signals. The operations of block 1520 may be performed in accordance with examples as disclosed herein. In some examples, aspects of the operations of 1520 may be performed by a sampling component 845 as described with reference to FIG. 8. In some cases, means for performing the operations of 1520 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1520 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1525, the method may include transmitting, via the sidelink with the UE, one or more second signals that include the set of samples of the one or more first MIMO signals. The operations of block 1525 may be performed in accordance with examples as disclosed herein. In some examples, aspects of the operations of 1525 may be performed by a second signal communications component 835 as described with reference to FIG. 8. In some cases, means for performing the operations of 1525 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1525 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1530, the method may include communicating, via the sidelink with the UE, the one or more second signals that are based on the one or more first MIMO signals intended for communications between the UE and the network entity utilizing the second channel rank. The operations of block 1530 may be performed in accordance with examples as disclosed herein. In some examples, aspects of the operations of 1530 may be performed by a second signal communications component 835 as described with reference to FIG. 8. In some cases, means for performing the operations of 1530 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1530 at a UE 115 may include, for example, one or more antennas 1325, a transceiver 1315, a communications manager 1320, one or more memories 1330 (e.g., including code 1335), one or more processors 1340, one or more buses 1345, or any combination thereof.

Figure 16:
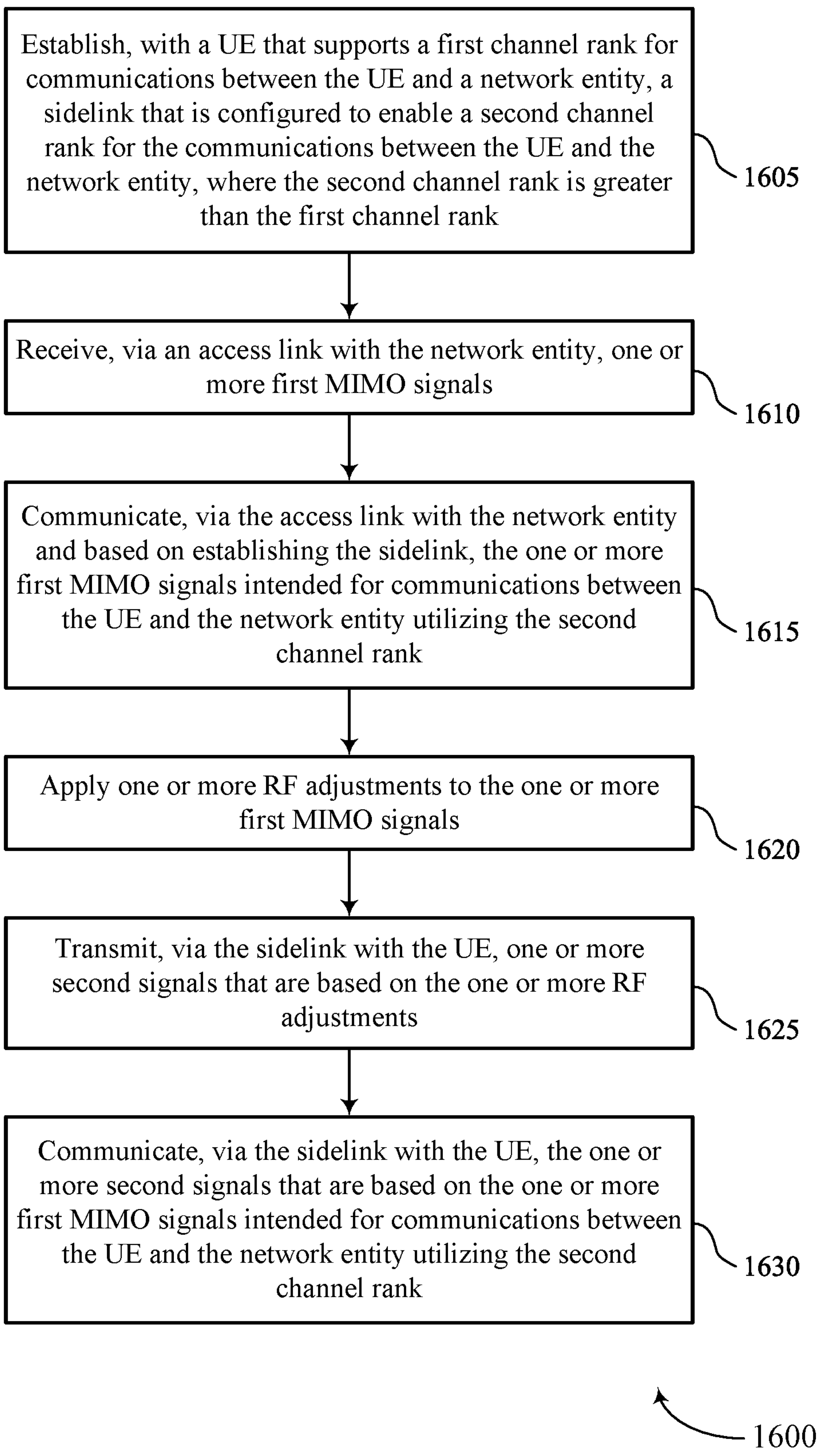

FIG. 16 shows a flowchart illustrating a method 1600 that supports rank augmentation using sidelink and companion devices in accordance with aspects of the present disclosure. The operations of the method 1600 may be implemented by a wireless device or its components as described herein. For example, the operations of the method 1600 may be performed by a UE 115, or a wireless device 215, as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1605, the method may include establishing, with a UE that supports a first channel rank for communications between the UE and a network entity, a sidelink that is configured to enable a second channel rank for the communications between the UE and the network entity, where the second channel rank is greater than the first channel rank. The operations of block 1605 may be performed in accordance with examples as disclosed herein. In some examples, aspects of the operations of 1605 may be performed by a sidelink component 825 as described with reference to FIG. 8. In some cases, means for performing the operations of 1605 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1605 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1610, the method may include receiving, via an access link with the network entity, one or more first MIMO signals. The operations of block 1610 may be performed in accordance with examples as disclosed herein. In some examples, aspects of the operations of 1610 may be performed by a MIMO signal communications component 830 as described with reference to FIG. 8. In some cases, means for performing the operations of 1610 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1610 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1615, the method may include communicating, via the access link with the network entity and based on establishing the sidelink, the one or more first MIMO signals intended for communications between the UE and the network entity utilizing the second channel rank. The operations of block 1615 may be performed in accordance with examples as disclosed herein. In some examples, aspects of the operations of 1615 may be performed by a MIMO signal communications component 830 as described with reference to FIG. 8. In some cases, means for performing the operations of 1615 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1615 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1620, the method may include applying one or more radio frequency adjustments to the one or more first MIMO signals. The operations of block 1620 may be performed in accordance with examples as disclosed herein. In some examples, aspects of the operations of 1620 may be performed by an RF adjustment component 855 as described with reference to FIG. 8. In some cases, means for performing the operations of 1620 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1620 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1625, the method may include transmitting, via the sidelink with the UE, one or more second signals that are based on the one or more radio frequency adjustments. The operations of block 1625 may be performed in accordance with examples as disclosed herein. In some examples, aspects of the operations of 1625 may be performed by a second signal communications component 835 as described with reference to FIG. 8. In some cases, means for performing the operations of 1625 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1625 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1630, the method may include communicating, via the sidelink with the UE, the one or more second signals that are based on the one or more first MIMO signals intended for communications between the UE and the network entity utilizing the second channel rank. The operations of block 1630 may be performed in accordance with examples as disclosed herein. In some examples, aspects of the operations of 1630 may be performed by a second signal communications component 835 as described with reference to FIG. 8. In some cases, means for performing the operations of 1630 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1630 at a UE 115 may include, for example, one or more antennas 1325, a transceiver 1315, a communications manager 1320, one or more memories 1330 (e.g., including code 1335), one or more processors 1340, one or more buses 1345, or any combination thereof.

Figure 17:
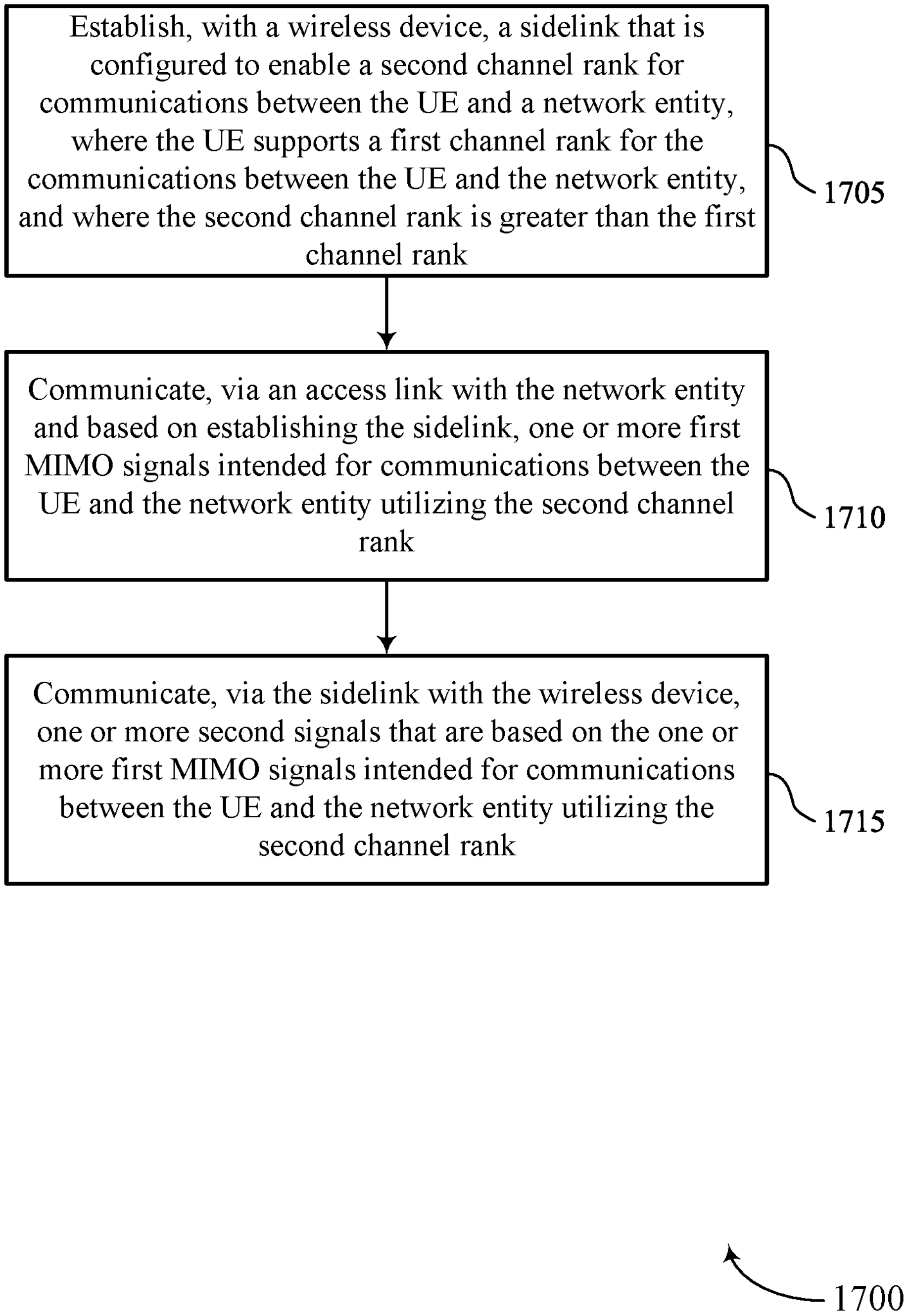

FIG. 17 shows a flowchart illustrating a method 1700 that supports rank augmentation using sidelink and companion devices in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1705, the method may include establishing, with a wireless device, a sidelink that is configured to enable a second channel rank for communications between the UE and a network entity, where the UE supports a first channel rank for the communications between the UE and the network entity, and where the second channel rank is greater than the first channel rank. The operations of block 1705 may be performed in accordance with examples as disclosed herein. In some examples, aspects of the operations of 1705 may be performed by a sidelink component 1225 as described with reference to FIG. 12. In some cases, means for performing the operations of 1705 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1705 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1710, the method may include communicating, via an access link with the network entity and based on establishing the sidelink, one or more first MIMO signals intended for communications between the UE and the network entity utilizing the second channel rank. The operations of block 1710 may be performed in accordance with examples as disclosed herein. In some examples, aspects of the operations of 1710 may be performed by a MIMO signal communications component 1230 as described with reference to FIG. 12. In some cases, means for performing the operations of 1710 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1710 at a UE 115 may include, for example, one or more antennas 1325, a transceiver 1315, a communications manager 1320, one or more memories 1330 (e.g., including code 1335), one or more processors 1340, one or more buses 1345, or any combination thereof.

At 1715, the method may include communicating, via the sidelink with the wireless device, one or more second signals that are based on the one or more first MIMO signals intended for communications between the UE and the network entity utilizing the second channel rank. The operations of block 1715 may be performed in accordance with examples as disclosed herein. In some examples, aspects of the operations of 1715 may be performed by a second signal communications component 1235 as described with reference to FIG. 12. In some cases, means for performing the operations of 1715 at one or more wireless devices 215 may include, for example, one or more antennas 925, a transceiver 915, a communications manager 920, one or more memories 930 (e.g., including code 935), one or more processors 940, one or more buses 945, or any combination thereof. Additionally, or alternatively, means for performing the operations of 1715 at a UE 115 may include, for example, one or more antennas 1325, a transceiver 1315, a communications manager 1320, one or more memories 1330 (e.g., including code 1335), one or more processors 1340, one or more buses 1345, or any combination thereof.

The following provides an overview of aspects of the present disclosure:

Aspect 1: A method for wireless communications at wireless device, comprising: establishing, with a UE that supports a first channel rank for communications between the UE and a network entity, a sidelink that is configured to enable a second channel rank for the communications between the UE and the network entity, wherein the second channel rank is greater than the first channel rank; communicating, via an access link with the network entity and based at least in part on establishing the sidelink, one or more first multiple-input multiple-output (MIMO) signals intended for communications between the UE and the network entity utilizing the second channel rank; and communicating, via the sidelink with the UE, one or more second signals that are based at least in part on the one or more first MIMO signals intended for communications between the UE and the network entity utilizing the second channel rank.

Aspect 2: The method of aspect 1, wherein the wireless device supports a third channel rank for the access link between the wireless device and the network entity, and the second channel rank is based at least in part on a combination of the first channel rank and the third channel rank.

Aspect 3: The method of any of aspects 1 through 2, wherein the second channel rank is based at least in part on a combined antenna count of a first set of antennas at the wireless device and second set of antennas at the UE.

Aspect 4: The method of any of aspects 1 through 3, further comprising: transmitting, to the UE, the network entity, or both, capability information associated with enabling the second channel rank by the wireless device and the UE.

Aspect 5: The method of any of aspects 1 through 4, wherein communicating the one or more first MIMO signals and the one or more second signals comprises: receiving, via the access link with the network entity, the one or more first MIMO signals; generating a set of samples of the one or more first MIMO signals; and transmitting, via the sidelink with the UE, the one or more second signals that comprise the set of samples of the one or more first MIMO signals.

Aspect 6: The method of aspect 5, further comprising: transmitting, via the sidelink with the UE, respective timestamps for each sample of the set of samples, wherein each respective timestamp supports synchronization of the one or more first MIMO signals between the wireless device and the UE.

Aspect 7: The method of any of aspects 1 through 6, further comprising: receiving, from the UE via the sidelink, control information comprising timing information for communicating the one or more first MIMO signals, one or more quantization parameters for quantizing samples of the one or more first MIMO signals, or both, wherein the one or more first MIMO signals, the one or more second signals, or both, are communicated in accordance with the control information.

Aspect 8: The method of any of aspects 1 through 7, wherein communicating the one or more first MIMO signals and the one or more second signals comprises: receiving, via the sidelink with the UE, the one or more second signals that comprise a set of samples corresponding to the one or more first MIMO signals; and transmitting, via the access link with the network entity, the one or more first MIMO signals based at least in part on the set of samples.

Aspect 9: The method of aspect 8, wherein the one or more second signals comprise timing information associated with transmitting the one or more first MIMO signals, the one or more first MIMO signals are transmitted in accordance with the timing information.

Aspect 10: The method of any of aspects 1 through 4, wherein communicating the one or more first MIMO signals and the one or more second signals comprises: receiving, via the access link with the network entity, the one or more first MIMO signals; applying one or more radio frequency adjustments to the one or more first MIMO signals; and transmitting, via the sidelink with the UE, the one or more second signals that are based at least in part on the one or more radio frequency adjustments.

Aspect 11: The method of aspect 10, wherein applying the one or more radio frequency adjustments comprises: converting the one or more first MIMO signals from a first carrier frequency to a second carrier frequency, duplicating the one or more first MIMO signals over a plurality of contiguous carrier frequencies, amplifying the one or more first MIMO signals, or any combination thereof.

Aspect 12: The method of any of aspects 10 through 11, wherein applying the one or more radio frequency adjustments to the one or more first MIMO signals comprises: applying at least one respective frequency adjustment at each antenna in the wireless device.

Aspect 13: The method of any of aspects 1 through 4, and 10 through 12, wherein communicating the one or more first MIMO signals and the one or more second signals comprises: receiving, via the sidelink with the UE, the one or more second signals corresponding to the one or more first MIMO signals; applying one or more radio frequency adjustments to the one or more second signals; and transmitting, via the access link with the network entity, the one or more first MIMO signals based at least in part on the one or more radio frequency adjustments.

Aspect 14: The method of any of aspects 1 through 13, wherein the one or more first MIMO signals communicated between the wireless device and the network entity supplement one or more additional first MIMO signals communicated between the UE and the network entity.

Aspect 15: The method of any of aspects 1 through 14, wherein the wireless device comprises extended reality eyewear or a smartwatch.

Aspect 16: The method of any of aspects 1 through 15, wherein the wireless device is a second UE.

Aspect 17: A method for wireless communications at a UE, comprising: establishing, with a wireless device, a sidelink that is configured to enable a second channel rank for communications between the UE and a network entity, wherein the UE supports a first channel rank for the communications between the UE and the network entity, and wherein the second channel rank is greater than the first channel rank; communicating, via an access link with the network entity and based at least in part on establishing the sidelink, one or more first multiple-input multiple-output (MIMO) signals intended for communications between the UE and the network entity utilizing the second channel rank; and communicating, via the sidelink with the wireless device, one or more second signals that are based at least in part on the one or more first MIMO signals intended for communications between the UE and the network entity utilizing the second channel rank.

Aspect 18: The method of aspect 17, wherein the wireless device supports a third channel rank for communications between the wireless device and the network entity, and the second channel rank is based at least in part on a combination of the first channel rank and the third channel rank.

Aspect 19: The method of any of aspects 17 through 18, wherein the second channel rank is based at least in part on a combined antenna count of a first set of antennas at the wireless device and second set of antennas at the UE.

Aspect 20: The method of any of aspects 17 through 19, further comprising: transmitting, to the wireless device, the network entity, or both, capability information associated with enabling the second channel rank by the wireless device and the UE.

Aspect 21: The method of aspect 20, wherein the capability information comprises an indication of a duration associated with communicating via the access link with the network entity, a feedback response duration, a quantity of antennas associated with the wireless device and the UE, or any combination thereof.

Aspect 22: The method of any of aspects 17 through 21, further comprising: transmitting, to the network entity, channel state information associated with utilizing the second channel rank for communications between the UE and the network entity.

Aspect 23: The method of any of aspects 17 through 22, wherein communicating the one or more first MIMO signals and the one or more second signals comprises: receiving, via the sidelink with the wireless device, the one or more second signals comprising a set of samples associated with the one or more first MIMO signals; receiving, via the access link with the network entity, the one or more first MIMO signals; and processing the one or more first MIMO signals in combination with the one or more second signals.

Aspect 24: The method of aspect 23, further comprising: receiving, via the sidelink with the wireless device, respective timestamps for each sample of the set of samples, wherein the one or more first MIMO signals are processed in combination with the one or more second signals based at least in part on the respective timestamps.

Aspect 25: The method of any of aspects 17 through 24, further comprising: transmitting, to the wireless device via the sidelink, control information comprising timing information for communicating the one or more first MIMO signals, one or more quantization parameters for quantizing samples of the one or more first MIMO signals, or both, wherein the one or more second signals are received based at least in part on the control information.

Aspect 26: The method of any of aspects 17 through 25, wherein communicating the one or more first MIMO signals and the one or more second signals comprises: transmitting, via the sidelink with the wireless device, the one or more second signals that comprise a set of samples corresponding to the one or more first MIMO signals; and transmitting, via the access link with the network entity, the one or more first MIMO signals.

Aspect 27: The method of aspect 26, wherein the one or more second signals comprise timing information associated with transmitting the one or more first MIMO signals, the one or more first MIMO signals are transmitted in accordance with the timing information.

Aspect 28: The method of any of aspects 17 through 22, wherein communicating the one or more first MIMO signals and the one or more second signals comprises: receiving, via the sidelink with the wireless device, the one or more second signals that are based at least in part on the one or more first MIMO signals received by the wireless device; and combining a plurality of carrier frequencies associated with the one or more second signals and the one or more first MIMO signals received at the UE.

Aspect 29: The method of any of aspects 17 through 22, and 28, wherein communicating the one or more first MIMO signals and the one or more second signals comprises: transmitting, via the sidelink with the wireless device, the one or more second signals that are based at least in part on the one or more first MIMO signals to be transmitted by the UE; and transmitting, via the access link with the network entity, the one or more first MIMO signals.

Aspect 30: The method of any of aspects 17 through 29, wherein the one or more first MIMO signals communicated between the UE and the network entity supplement one or more additional first MIMO signals communicated between the wireless device and the network entity.

Aspect 31: The method of any of aspects 17 through 30, wherein the wireless device comprises extended reality eyewear or a smartwatch.

Aspect 32: The method of any of aspects 17 through 31, wherein the wireless device is a second UE.

Aspect 33: A wireless device for wireless communications, comprising one or more memories storing processor-executable code, a transceiver, and one or more processors coupled with the one or more memories and the transceiver, the one or more processors individually or collectively operable to execute the code to cause the wireless device to perform a method of any of aspects 1 through 16.

Aspect 34: A wireless device for wireless communications, comprising at least one means for performing a method of any of aspects 1 through 16.

Aspect 35: A non-transitory computer-readable medium storing code for wireless communications, the code comprising instructions executable by one or more processors to perform a method of any of aspects 1 through 16.

Aspect 36: A UE for wireless communications, comprising one or more memories storing processor-executable code, a transceiver, and one or more processors coupled with the one or more memories and the transceiver, the one or more processors individually or collectively operable to execute the code to cause the UE to perform a method of any of aspects 17 through 32.

Aspect 37: A UE for wireless communications, comprising at least one means for performing a method of any of aspects 17 through 32.

Aspect 38: A non-transitory computer-readable medium storing code for wireless communications, the code comprising instructions executable by one or more processors to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:

one or more memories storing processor-executable code;

a transceiver; and one or more processors coupled with the one or more memories and the transceiver, and individually or collectively operable to execute the code to cause the wireless device to:

establish, with a user equipment (UE) that supports a first channel rank for communications between the UE and a network entity, a sidelink that is configured to enable a second channel rank for the communications between the UE and the network entity, wherein the second channel rank is greater than the first channel rank;

communicate, via the transceiver and an access link with the network entity and based at least in part on establishing the sidelink, one or more first multiple-input multiple-output (MIMO) signals intended for communications between the UE and the network entity utilizing the second channel rank; and communicate, via the transceiver and the sidelink with the UE, one or more second signals that are based at least in part on the one or more first MIMO signals intended for communications between the UE and the network entity utilizing the second channel rank.

2. The wireless device of claim 1, wherein the wireless device supports a third channel rank for the access link between the wireless device and the network entity, and wherein the second channel rank is based at least in part on a combination of the first channel rank and the third channel rank.

3. The wireless device of claim 1, wherein the second channel rank is based at least in part on a combined antenna count of a first set of antennas at the wireless device and a second set of antennas at the UE.

4. The wireless device of claim 1, wherein the one or more processors are individually or collectively further operable to execute the code to cause the wireless device to:

transmit, to the UE via the transceiver, the network entity, or both, capability information associated with enabling the second channel rank by the wireless device and the UE.

5. The wireless device of claim 1, wherein, to communicate the one or more first MIMO signals and the one or more second signals, the one or more processors are individually or collectively operable to execute the code to cause the wireless device to:

receive, via the transceiver and the access link with the network entity, the one or more first MIMO signals;

generate a set of samples of the one or more first MIMO signals; and transmit, via the transceiver and the sidelink with the UE, the one or more second signals that comprise the set of samples of the one or more first MIMO signals.

6. The wireless device of claim 5, wherein the one or more processors are individually or collectively further operable to execute the code to cause the wireless device to:

transmit, via the transceiver and the sidelink with the UE, respective timestamps for each sample of the set of samples, wherein each respective timestamp supports synchronization of the one or more first MIMO signals between the wireless device and the UE.

7. The wireless device of claim 1, wherein the one or more processors are individually or collectively further operable to execute the code to cause the wireless device to:

receive, from the UE via the sidelink and the transceiver, control information comprising timing information for communicating the one or more first MIMO signals, one or more quantization parameters for quantizing samples of the one or more first MIMO signals, or both, wherein the one or more first MIMO signals, the one or more second signals, or both, are communicated in accordance with the control information.

8. The wireless device of claim 1, wherein, to communicate the one or more first MIMO signals and the one or more second signals, the one or more processors are individually or collectively operable to execute the code to cause the wireless device to:

receive, via the transceiver and the sidelink with the UE, the one or more second signals that comprise a set of samples corresponding to the one or more first MIMO signals; and transmit, via the transceiver and the access link with the network entity, the one or more first MIMO signals based at least in part on the set of samples.

9. The wireless device of claim 8, wherein the one or more second signals comprise timing information associated with transmitting the one or more first MIMO signals, and wherein the one or more first MIMO signals are transmitted in accordance with the timing information.

10. The wireless device of claim 1, wherein, to communicate the one or more first MIMO signals and the one or more second signals, the one or more processors are individually or collectively operable to execute the code to cause the wireless device to:

receive, via the transceiver and the access link with the network entity, the one or more first MIMO signals;

apply one or more radio frequency adjustments to the one or more first MIMO signals; and transmit, via the transceiver and the sidelink with the UE, the one or more second signals that are based at least in part on the one or more radio frequency adjustments.

11. The wireless device of claim 10, wherein, to apply the one or more radio frequency adjustments, the one or more processors are individually or collectively operable to execute the code to cause the wireless device to:

convert the one or more first MIMO signals from a first carrier frequency to a second carrier frequency, duplicating the one or more first MIMO signals over a plurality of contiguous carrier frequencies, amplifying the one or more first MIMO signals, or any combination thereof.

12. The wireless device of claim 10, wherein, to apply the one or more radio frequency adjustments to the one or more first MIMO signals, the one or more processors are individually or collectively operable to execute the code to cause the wireless device to:

apply at least one respective frequency adjustment at each antenna in the wireless device.

13. The wireless device of claim 1, wherein, to communicate the one or more first MIMO signals and the one or more second signals, the one or more processors are individually or collectively operable to execute the code to cause the wireless device to:

receive, via the transceiver and the sidelink with the UE, the one or more second signals corresponding to the one or more first MIMO signals;

apply one or more radio frequency adjustments to the one or more second signals; and transmit, via the transceiver and the access link with the network entity, the one or more first MIMO signals based at least in part on the one or more radio frequency adjustments.

14. The wireless device of claim 1, wherein the one or more first MIMO signals between the wireless device and the network entity supplement one or more additional first MIMO signals between the UE and the network entity.

15. The wireless device of claim 1, wherein the wireless device comprises extended reality eyewear or a smartwatch.

16. The wireless device of claim 1, wherein the wireless device is a second UE.

17. A user equipment (UE), comprising:

one or more memories storing processor-executable code;

a transceiver; and one or more processors coupled with the one or more memories and the transceiver, and individually or collectively operable to execute the code to cause the UE to:

establish a sidelink with a wireless device, wherein the UE supports a first channel rank for communications between the UE and a network entity, and wherein the sidelink is configured to enable an effective second channel rank for the communications between the UE and the network entity that is greater than the first channel rank;

communicate, via the transceiver and an access link with the network entity and based at least in part on establishing the sidelink, one or more first multiple-input multiple-output (MIMO) signals intended for communications between the UE and the network entity utilizing the effective second channel rank; and communicate, via the transceiver and the sidelink with the wireless device, one or more second signals that are based at least in part on the one or more first MIMO signals intended for communications between the UE and the network entity utilizing the effective second channel rank.

18. The UE of claim 17, wherein the wireless device supports a third channel rank for communications between the wireless device and the network entity, and wherein the effective second channel rank is based at least in part on a combination of the first channel rank and the third channel rank.

19. The UE of claim 17, wherein the effective second channel rank is based at least in part on a combined antenna count of a first set of antennas at the wireless device and a second set of antennas at the UE.

20. The UE of claim 17, wherein the one or more processors are individually or collectively further operable to execute the code to cause the UE to:

transmit, via the transceiver, to the wireless device, the network entity, or both, capability information associated with enabling the effective second channel rank by the wireless device and the UE.

21. The UE of claim 20, wherein the capability information comprises an indication of a duration associated with communicating via the access link with the network entity, a feedback response duration, a quantity of antennas associated with the wireless device and the UE, or any combination thereof.

22. The UE of claim 17, wherein the one or more processors are individually or collectively further operable to execute the code to cause the UE to:

transmit, via the transceiver, to the network entity, channel state information associated with utilizing the effective second channel rank for communications between the UE and the network entity.

23. The UE of claim 17, wherein, to communicate the one or more first MIMO signals and the one or more second signals, the one or more processors are individually or collectively operable to execute the code to cause the UE to:

receive, via the transceiver and the sidelink with the wireless device, the one or more second signals comprising a set of samples associated with the one or more first MIMO signals;

receive, via the transceiver and the access link with the network entity, the one or more first MIMO signals; and process the one or more first MIMO signals in combination with the one or more second signals.

24. The UE of claim 17, wherein the one or more processors are individually or collectively further operable to execute the code to cause the UE to:

transmit, via the transceiver, to the wireless device via the sidelink, control information comprising timing information for communicating the one or more first MIMO signals, one or more quantization parameters for quantizing samples of the one or more first MIMO signals, or both, wherein the one or more second signals are received based at least in part on the control information.

25. The UE of claim 17, wherein, to communicate the one or more first MIMO signals and the one or more second signals, the one or more processors are individually or collectively operable to execute the code to cause the UE to:

transmit, via the transceiver and the sidelink with the wireless device, the one or more second signals that comprise a set of samples corresponding to the one or more first MIMO signals; and transmit, via the transceiver and the access link with the network entity, the one or more first MIMO signals.

26. The UE of claim 17, wherein, to communicate the one or more first MIMO signals and the one or more second signals, the one or more processors are individually or collectively operable to execute the code to cause the UE to:

receive, via the transceiver and the sidelink with the wireless device, the one or more second signals that are based at least in part on the one or more first MIMO signals received by the wireless device; and combine a plurality of carrier frequencies associated with the one or more second signals and the one or more first MIMO signals received at the UE.

27. The UE of claim 17, wherein, to communicate the one or more first MIMO signals and the one or more second signals, the one or more processors are individually or collectively operable to execute the code to cause the UE to:

transmit, via the transceiver and the sidelink with the wireless device, the one or more second signals that are based at least in part on the one or more first MIMO signals to be transmitted by the UE; and transmit, via the transceiver and the access link with the network entity, the one or more first MIMO signals.

28. The UE of claim 17, wherein the one or more first MIMO signals between the UE and the network entity supplement one or more additional first MIMO signals between the wireless device and the network entity.

29. A method for wireless communications at a wireless device, comprising:

establishing, with a user equipment (UE) that supports a first channel rank for communications between the UE and a network entity, a sidelink that is configured to enable a second channel rank for the communications between the UE and the network entity, wherein the second channel rank is greater than the first channel rank;

communicating, via an access link with the network entity and based at least in part on establishing the sidelink, one or more first multiple-input multiple-output (MIMO) signals intended for communications between the UE and the network entity utilizing the second channel rank; and communicating, via the sidelink with the UE, one or more second signals that are based at least in part on the one or more first MIMO signals intended for communications between the UE and the network entity utilizing the second channel rank.

30. A method for wireless communications at a user equipment (UE), comprising:

establishing a sidelink with a wireless device, wherein the UE supports a first channel rank for communications between the UE and a network entity, and wherein the sidelink is configured to enable an effective second channel rank for the communications between the UE and the network entity that is greater than the first channel rank;

communicating, via an access link with the network entity and based at least in part on establishing the sidelink, one or more first multiple-input multiple-output (MIMO) signals intended for communications between the UE and the network entity utilizing the effective second channel rank; and communicating, via the sidelink with the wireless device, one or more second signals that are based at least in part on the one or more first MIMO signals intended for communications between the UE and the network entity utilizing the effective second channel rank.

* * * * *